US010800968B2

(12) United States Patent
Li et al.

(10) Patent No.: US 10,800,968 B2
(45) Date of Patent: Oct. 13, 2020

(54) METAL ORGANIC FRAMEWORK (MOF) YELLOW PHOSPHORS AND THEIR APPLICATIONS IN WHITE LIGHT EMITTING DEVICES

(71) Applicant: Rutgers, The State University of New Jersey, New Brunswick, NJ (US)

(72) Inventors: Jing Li, Cranbury, NJ (US); Zhichao Hu, Piscataway, NJ (US); Qihan Gong, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 789 days.

(21) Appl. No.: 15/306,677

(22) PCT Filed: Apr. 24, 2015

(86) PCT No.: PCT/US2015/027583
§ 371 (c)(1),
(2) Date: Oct. 25, 2016

(87) PCT Pub. No.: WO2015/164784
PCT Pub. Date: Oct. 29, 2015

(65) Prior Publication Data
US 2017/0044428 A1    Feb. 16, 2017

Related U.S. Application Data

(60) Provisional application No. 61/984,154, filed on Apr. 25, 2014.

(51) Int. Cl.
| | | |
|---|---|---|
| *C09K 11/06* | (2006.01) | |
| *F21V 9/30* | (2018.01) | |
| *C07F 3/00* | (2006.01) | |
| *F21K 9/64* | (2016.01) | |
| *C09D 5/22* | (2006.01) | |
| *F21Y 115/10* | (2016.01) | |

(52) U.S. Cl.
CPC .............. *C09K 11/06* (2013.01); *C07F 3/003* (2013.01); *C09D 5/22* (2013.01); *F21K 9/64* (2016.08); *F21V 9/30* (2018.02); *C09K 2211/183* (2013.01); *C09K 2211/188* (2013.01); *F21Y 2115/10* (2016.08); *Y02B 20/181* (2013.01)

(58) Field of Classification Search
CPC ................... C07F 3/003; C09K 11/06
See application file for complete search history.

(56) References Cited

U.S. PATENT DOCUMENTS

| | | |
|---|---|---|
| 7,985,868 B1 | 7/2011 | Bauer et al. |
| 8,367,419 B2 | 2/2013 | Li et al. |
| 2004/0110950 A1 | 6/2004 | Li et al. |
| 2013/0042758 A1 | 2/2013 | Li et al. |

FOREIGN PATENT DOCUMENTS

WO    2013058845 A1    4/2013

OTHER PUBLICATIONS

Gallis, et al: Efficient Photoluminescence via Metal-Ligand Alteration in a New MOFs Family, Chemistry of Materials, 2014, No. 26, pp. 2943-2951.
Zheng, et al: "A Facile Approach Towards Multicomponent Supramolecular Structures: Selective Self-Assembly Via Charge Separation", Journal of the American Chemical Society, Dec. 1, 2010, vol. 132, No. 47, pp. 16873-16882.
Hu, et al: "Achieving Exceptionally High Luminescence Quantum Efficiency by Immobilizing an AIE Molecular Chromophore into a Metal-Organic Framework", 2015, Chem. Commun., vol. 51, pp. 3045-3048.
Gong, et al: "Solution Processable MOF Yellow Phosphor with Exceptionally High Quantum Efficiency", Journal of the American Chemical Society, 2014, vol. 136, pp. 16724-16727.
Shustova, et al: "Turn-On Fluorescence in Tetraphenylethylene-Based Metal-Organic Frameworks: An Alternative to Aggregation-Induced Emission", Journal of the American Chemical Society, 2011, No. 133, pp. 20126-20129.
Shustova, et al: "Phenyl Ring Dynamics in a Tetraphenylethylene-Bridged Metal-Organic Framework: Implications for the Mechanism of Aggregation-Induced Emission", Journal of the American Chemical Society, 2012, No. 134, pp. 15061-15070.
So, et al: "Layer-by-Layer Fabrication of Oriented Porous Thin Films Based on Porphyrin-Containing Metal-Organic Frameworks", Journal of the American Chemical Society, 2013, No. 135, pp. 15698-15701.
Banerjee, et al: "Luminescent Megal-Organic Frameworks as Explosive Sensors", Dalton Transactions, 2014, No. 43, pp. 10668-10685.
Lan, et al: "A Luminescent Microporous Metal-Organic Framework For the Fast and Reversible Detection of High Explosives", Agnew. Chem. Int. Ed., 2009, No. 48, pp. 2334-2338.
Hu, et al: "Effective Sensing of RDX Via Instant and Selective Detection of Ketone Vapors", Chemical Science, 2014, No. 5, pp. 4873-4877.
Pramanik, et al: "New Microporous Metal-Organic Framework Demonstrating Unique Selectivity for Detection of High Explosives and Aromatic Compounds", Journal of the American Chemical Society, 2011, pp. 133, pp. 4153-4155.

(Continued)

*Primary Examiner* — Joseph R Kosack
(74) *Attorney, Agent, or Firm* — Fox Rothschild LLP

(57) ABSTRACT

The present application discloses the first rare-earth-free metal organic framework (MOF) yellow phosphors that can be effectively excited by blue light and assembled in a white light emission (WLED) device with a blue chip. The compounds of the present invention exhibit significantly enhanced emission intensity compared to the constituent ligand and high quantum yield and high thermal and moisture stability and photoluminescence. The invention also includes light emitting devices comprising any of these MOF yellow phosphors and methods of preparing these compounds and devices.

21 Claims, 7 Drawing Sheets

(56) References Cited

OTHER PUBLICATIONS

Hu, et al: "Selective, Sensitive, and Reversible Detection of Vapor-Phase High Explosives via Two-Dimensional Mapping: A New Strategy for MOF-Based Sensors", Crystal Growth & Design, 2013, No. 13, pp. 4204,4207.
Banerjee, et al: "Vapor Phase Detection of Nitroaromatic and Nitroaliphatic Explosives by Fluorescence Active Metal-Organic Frameworks", CrystEngComm, 2013, No. 15, pp. 9745-9750.
Pramanik, et al: "A Systematic Study of Fluorescence-Based Detection of Nitroexplosives and Other Aromatics in the Vapor Phase by Microporous Metal-Organic Frameworks", Chem. Eur. J., 2013, No. 19, pp. 15964-15971.
NPL_WEI et al: Rigidifying Fluorescent Linkers by Megal-Organic Framework Formation for Fluorescence Blue Shift and Quantum Yield Enhancement. May 2014, J. Am. Chem. Soc. vol. 136, pp. 8269-8276. [retrieved on Aug. 11, 2015]. Retrieved from the internet: <URL: http://www.chem.tamu.edu/rgroup/zhou/PDF/165.pdf>. entire document.
Zhang, et al: "Systematic Approach in Designing Rare-Earth-Free Hybrid Semiconductor Phosphors for General Lighting Applications", Journal of the American Chemical Society, 2014, vol. 136, pp. 14230-14236.

METAL ORGANIC FRAMEWORK (MOF) YELLOW PHOSPHORS AND THEIR APPLICATIONS IN WHITE LIGHT EMITTING DEVICES

CROSS-REFERENCE TO RELATED APPLICATIONS

This application claims priority under 35 USC § 119(e) to U.S. Provisional Patent Application Ser. No. 61/984,154, filed on Apr. 25, 2015, which is hereby incorporated by reference in its entirety.

STATEMENT REGARDING FEDERALLY FUNDED RESEARCH

This invention was made in part with government support under Grant No. DMR-1206700 awarded by the National Science Foundation. The government has certain rights in the invention.

FIELD OF THE INVENTION

The present invention relates to metal organic frameworks useful as yellow phosphors and their applications in white light emitting devices.

BACKGROUND OF THE INVENTION

Because of their lower energy consumption, higher efficiency and longer lifetime, white light-emitting diodes (WLEDs) are gradually replacing incandescent lamps and fluorescent lamps. Existing approaches to fabricate WLEDs include (a) combination of three primary colored LED chips, namely red, green, and blue (RGB) diodes; or (b) phosphor-conversion (PC), in which either a yellow-emitting phosphor is coated on a blue LED chip or red, green and blue emitting phosphors are coated on a UV (or near UV) chip to produce white light. In addition, (c) coating direct white light emitting phosphors on a UV chip has also proven to be another effective method to generate phosphor converted WLEDs. Examples of white-emitting phosphors include inorganic-organic hybrid semiconductor bulk materials based on 2D-[$Zn_2S_2$(L)] (L=monoamine), nanomaterials, rare earth elements doped inorganic materials and metal complexes.

Most of today's commercially available products are PC-LEDs rather than RGB-LEDs, because the latter type is more expensive. Among various PC-LEDs, both RGB and white phosphors require use of a UV chip, which is associated with drawbacks such as higher energy and costs, as well as possible leak of UV radiation. WLEDs made of yellow phosphor-coated blue LED are more preferred for their apparent advantages. At present, almost all commercial phosphors are oxides, sulfides, oxysulfides, oxynitrides, or nitrides doped with rare-earth ions (e.g. europium, terbium, and yttrium). The rare earth ions play a crucial role in controlling the color and quality of the light emitted by these phosphors. However, the critical supply issue that the world is facing today has pushed the search for alternative rare-earth free phosphors to a level of urgency. In fact, searching for rare-earth-free phosphors has become one of the most important and critical aspects in the research and development of white light-emitting diodes (WLEDs).

Metal organic frameworks (MOFs) have shown a variety of potential applications, such as gas storage and separation, catalysis, chemical sensing and explosive detection. In the area of MOF based phosphors, a direct white light emitting MOF was first reported in 2009, followed by several subsequent studies on different types of MOF structures. Other studies include $Eu^{2+}$ doped MOF that emits yellow light; and most recently a white emitting MOF composed of blue and yellow emitting framework and encapsulated Re-complex, respectively. However, in all cases, the MOFs must be excited by UV or near-UV radiation.

Therefore, developing new types of yellow phosphors and/or white light emitting materials that are energy efficient, cost-effective, free of rare earth elements, and can be excited by blue light is of great importance and in high demand.

BRIEF SUMMARY OF THE INVENTION

The present invention addresses this need. This invention provides novel rare-earth-free yellow phosphors by incorporating highly emissive organic ligands into three-dimensional metal-organic frameworks. The compounds form new types of crystalline structures and give bright yellow emission when excited by blue light. They have the highest quantum yields among all metal-organic yellow or white phosphors reported to date. Coupled with their high luminescent and thermal stability, as well as their solution processability, the new phosphors demonstrate considerable promise for use in WLEDs.

One aspect of the invention provides a polymeric coordination compound capable of forming a microporous metal organic framework, characterized by a plurality of layers comprising two-dimensional arrays of repeating structural units of formula $M_a(L^1)_b(L^2)_c \cdot xS$, wherein:

M is a transition metal cation;

$L^1$ is an organic ligand comprising 2 to 4 carboxylic acid groups or tetrazolyl groups, wherein at least one of said carboxylic acid groups or tetrazolyl groups is coordinated to a M in the same structural unit, and at least a second of said carboxylic acid groups or tetrazolyl groups is coordinated to a M in a different repeating structural unit within the same layer containing a two-dimensional array of repeating structural units;

$L^2$ is an organic ligand comprising 2 to 4 nitrogen atoms capable of coordinating to M, wherein $L^2$ coordinates to a M in a layer, and $L^2$ extends essentially perpendicularly from a plane defined by said layer containing a two-dimensional array of repeating structural units to further coordinate with a second M in a repeating structural unit in an adjacent layer;

S is a solvent capable of coordinating to M or as a guest molecule;

a and b are each independently an integer greater than 0;

c is an integer equal or greater than 0;

x is a fractional number or an integer equal or greater than 0; and

M, $L^1$, $L^2$, S, a, b, c, and x are so combined that the compound defines channels and pores of molecular size throughout the structure of the compound; and provided that when $L^2$ does not contain a phenylene moiety (—$C_6H_4$—) moiety, $L^1$ contains 3 or more phenylene moieties.

In some embodiments, the compound exhibits characteristics of yellow phosphors and is capable of emitting white light upon irradiation by a blue light. In some embodiments, when $L^2$ does not contain a phenylene moiety (—$C_6H_4$—) moiety, $L^1$ contains more than one phenylene moiety (—$C_6H_4$—) moiety in 1, 2, 3 or 4 arms of the ligand.

In some embodiments there is provided repeating units $M_2(L^1) \cdot xDMA$ (Formula II), wherein M is Zn, Cd, or Zr; x is 0 or an integer; and $L^1$ is tcbpe, tcbpe-F, ttzbpe, or tctpe.

In some embodiments of Formula II, M is Zn; $L^1$ is tcbpe; each Zn atom is tetrahedrally coordinated to O atoms from four different tcbpe ligand; all the carboxylate groups of tcbpe are bidentate with each O atom coordinated to a different Zn atom; two adjacent Zn atoms form an eight-membered ring with carboxylate groups from the ligand; and wherein the overall framework is three-dimensional (3D) with 1D channel along the c axis.

In some embodiments, there is provided repeating units of $M_a(L^1)_b(tppe)_c \cdot xS$ (Formula III), wherein M is Zn, Cd, or Zr; b is greater than 0; and $L^1$ is a bi-carboxylate or tri-carboxylate ligand selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diypdibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and derivatives thereof.

In some embodiments of Formula III, the repeating units comprises a primary building unit (PBU) and a paddle-wheel based secondary building unit (SBU), wherein M is Zn; the PBU comprises an octahedrally coordinated zinc metal connected to four oxygen atoms in two carboxylate groups from two different $L^1$ ligands and two N atoms from two different tppe ligands; each zinc atom of said SBU bonds to four carboxylate oxygen atoms from four $L^1$ ligands and an O atom from the solvent molecule S; and S is DMA. In some embodiments, the two types of building units PBU and SBU are connected by the $L^1$ ligand, forming a 3D net, and two identical nets interpenetrate to for a 3D framework. In some embodiments, $L^1$ is btc. In some embodiments, Formula III is (a) $M_6(btc)_4(tppe)_2 \cdot 2DMA] \cdot 11DMA$ (btc=benzene-1,3,5-tricarboxylic acid), wherein M is Zn or Cd, or (b) $Zr_3(btc)_4(tppe)_c$, wherein c is 1 or 2.

In some embodiment of Formula I, $L^1$ is selected from tcbpe, tcbpe-F, tcbpe-$CH_3$, tctpe, tcpe, tcbpe-$NH_2$, ttzbpe, and derivatives thereof; and $L^2$ is selected from 4,4'-bpy, bpee, bpe, and derivatives thereof.

Another aspect of the invention provides an article of manufacture comprising one or more compounds of the present invention.

In some embodiments, the one or more compounds are deposited in a pattern in the article such that a light of one or more patterned colors are emitted upon exposure to one or more exciting wavelengths.

In some embodiments, the article of manufacture further include a light emitting device having a light source capable of producing one or more wavelengths simultaneously or sequentially in the range of about 300-750 nm. In some embodiments, the light source comprises a light-emitting diode (LED) having a wavelength in the range of about 400-500 nm. In some embodiments, the compound emits a white light when being exposed to an exciting wavelength.

In some embodiments, the article of manufacture contain a compound having repeating units of $M_2(L^1) \cdot xDMA$, wherein M is selected from Zn, Cd, and Zr; x is 0 or an integer; and $L^1$ is selected from tcbpe, tcbpe-F, ttzbpe, and tctpe.

In some embodiments, the article of manufacture contain a compound having repeating units of $M_a(L^1)_b(tppe)_c \cdot xS$ wherein M is Zn; S is DMA; and $L^1$ is selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diyl)dibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and derivatives thereof.

Another aspect of the invention provides a method of producing a light comprising exposing the compound of claim 1 to an exciting wavelength.

In some embodiments, the exciting wavelength is about 400-700 nm. In some embodiments, the exciting wavelength is produced by a LED in the range of about 430-460 nm and the compound emits a white light upon exposure to the exciting wavelength.

Another aspect of the invention provides a method of preparing a compound of the present invention comprising (a) mixing a salt of M with $L^1$ and optionally $L^2$ in an organic solvent; and (b) heating the mixture at a temperature for a sufficient time to obtain the compound. In some embodiments, the organic solvent is DMA.

These and other aspects of the present invention will be described in greater detail below.

DESCRIPTION OF THE INVENTION

Figure 1A:
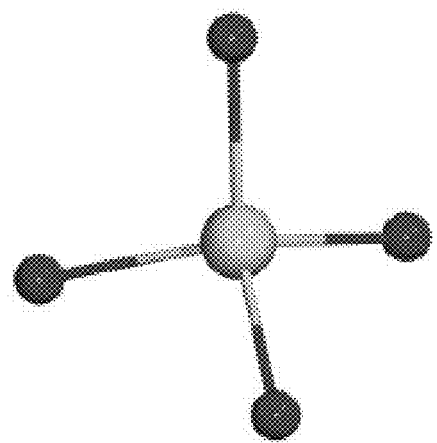
FIG. 1(a) illustrates the primary building unit of Compound 1 with the tetrahedrally coordinated $Zn^{2+}$.

Various embodiments of the present invention provides novel compounds and device for generating white lighting or display. In particular, the present invention provides a new type of luminescent MOF (LMOF) yellow phosphors free of rare-earth metals. These compounds have exceptionally high quantum yield (QY, e.g. 100-64.4% at $\lambda_{ex}$=360-450 nm) and can be excited effectively by blue light. It also exhibits high thermal and photoluminescent stability. The impressive performance of these LMOFs makes them promising yellow phosphors for use in WLEDs.

Throughout this patent document, various publications are referenced. The disclosures of these publications in their entireties are hereby incorporated by reference into this application in order to more fully describe the state of the art to which the disclosed matter pertains. While the following text may reference or exemplify specific elements of a ligand or a method of generating light, it is not intended to limit the scope of the invention to such particular reference or examples. Various modifications may be made by those skilled in the art, in view of practical and economic considerations, such as the substituents of the ligand and the article of manufacture comprising the compound of the present invention.

The articles "a" and "an" as used herein refers to "one or more" or "at least one," unless otherwise indicated. That is, reference to any element or component of the present invention by the indefinite article "a" or "an" does not exclude the possibility that more than one of the element or component is present.

The term "about" as used herein refers to the referenced numeric indication plus or minus 10% of that referenced numeric indication.

The term "analog" as used herein refers to a compound that bears substantial structural similarities to another compound. For example, an analog of $L^1$ ligand may bear a methyl group in an aryl ring as opposed to a hydrogen in the same position of the $L^1$ ligand.

Compounds

One aspect of the invention provides a polymeric coordination compound capable of forming a microporous metal organic framework, characterized by a plurality of layers comprising two-dimensional arrays of repeating structural units of formula of $M_a(L^1)_b(L^2)_c \cdot xS$, wherein:

M is a transition metal cation;

$L^1$ is an organic ligand comprising 2 to 4 carboxylic acid groups or tetrazolyl groups, wherein at least one of said carboxylic acid groups or tetrazolyl groups is coordinated to a M in the same structural unit, and at least a second of said carboxylic acid groups or tetrazolyl groups is coordinated to a M in a different repeating structural unit within the same layer containing a two-dimensional array of repeating structural units;

$L^2$ is an organic ligand comprising 2 to 4 nitrogen atoms capable of coordinating to M, wherein $L^2$ coordinates to a M in a layer, and $L^2$ extends essentially perpendicularly from a plane defined by said layer containing a two-dimensional array of repeating structural units to further coordinate with a second M in a repeating structural unit in an adjacent layer;

S is a solvent capable of coordinating to M or as a guest molecule;

a and b are each independently an integer greater than 0;

c is an integer equal or greater than 0;

x is a fractional number or an integer equal or greater than 0; and

M, $L^1$, $L^2$, S, a, b, c, and x are so combined that the compound defines channels and pores of molecular size throughout the structure of the compound; and provided that when $L^2$ does not contain a phenylene moiety ($-C_6H_4-$) moiety, $L^1$ contains 3 or more phenylene moieties.

In some embodiments, the compound exhibit characteristics of yellow phosphors and is capable of emitting white light upon irradiation by a blue light.

In some embodiments, when $L^2$ does not contain a phenylene moiety ($-C_6H_4-$) moiety, $L^1$ contains three or more phenylene moieties ($-C_6H_4-$) moiety. In some embodiments, $L^1$ contains 2, 3, 4 or more phenylene moiety ($-C_6H_4-$) moiety in each arm of the ligand.

Suitable metal atoms or cations for M include those from the main group elements and from the subgroup elements of the periodic system of the elements, namely of the groups Ia, IIa, IIIa, IVa to VIIIa and Ib to VIb. Examples of the metal include Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi. Non-limiting examples of cations include $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. In some embodiments, M is an atom or cation of Zn, Cd, or Zr. M in Formula I may represent one or more metal atoms or cations.

$L^1$ is an organic ligand which may contain 1, 2, 3, or 4 carboxylate group for binding to M. Non-limiting examples of $L^1$ include 4',4''',4''''',4'''''''-(ethene-1,1,2,2-tetrayl)tetrakis ([1,1'-biphenyl]-4-carboxylic acid) (tcbpe), 4',4''',4''''',4'''''''-(ethene-1,1,2,2-tetrayl)tetrakis([1,1'-biphenyl]-3-fluoro-4-carboxylic acid) (tcbpe-F), 1,1,2,2-tetrakis(4'-(2H-tetrazol-5-yl)-[1,1'-biphenyl]-4-yl)ethane (ttzbpe), 4'',4''''',4''''''', 4'''''''''-(ethene-1,1,2,2-tetrayl)tetrakis(([1,1':4',1''-terphenyl]-4-carboxylic acid)) (tctpe), and {1,2,4,5-tetrakis [4'-carboxy(1,1'-biphenyl-4-yl)]benzene} (tcbpb), 1,1,2,2-tetrakis(4-(2H-tetrazol-5-yl)phenyl)ethene (ttzpe). In some embodiments, $L^1$ is selected from tcbpe, tcbpe-F, ttzbpe, and tctpe. In some embodiments, each $L^1$ may contain 2-16, all subunits included, phenylene ($-C_6H_4-$) in a single ligand. In some embodiments, $L^1$ contains 4, 8, 12 or 16 phenylene ($-C_6H_4-$). The phenylene moieties may be evenly distributed to 2 or 4 arms of the ligand. In some embodiments, the phenylene moieties are evenly distributed to 4 arms of the ligand.

$L^2$ is an organic ligand containing 1, 2, 3, or 4 nitrogen atoms capable of coordinating to M. In some embodiments, each $L^2$ may contain 2-16, all subunits included, phenylene ($-C_6H_4-$) in a single ligand. In some embodiments, each $L^2$ contains 2, 4, 8, 12 or 16 phenylene ($-C_6H_4-$). The phenylene moieties may be evenly distributed to 2 or 4 arms of the ligand. In some embodiments, the phenylene moieties are evenly distributed to 2 arms of the ligand. For example, when c is greater than 0, $L^2$ may contain 2, 4, 6 or 8 phenylene moieties evenly distributed in 2 or 4 arms. Similarly, $L^2$ may contain 4 coordinating nitrogen atoms evenly distributed in 4 arms.

The subscripts a, b and c are each an integer independently selected from 0 to 20, all subunits included. In some embodiments, a, b and c are each an integer independently selected from 0, 1, 2, 3, 4, 5, 6, 7, 8, 9 and 10. The number X is an integer or a fractional number selected from 0 to 30, all subunits or factional numbers included. Non-limiting examples of X include 0, 0.25, 0.5, 1, 1.5, 2, 2.5, 5, 10, 15 and 20.

S represents a solvent molecule capable of coordinating to M or as a guest molecule. In some embodiments, S is a solvent molecule bearing sulfur, oxygen or nitrogen capable of coordinating to M. Non-limiting examples include DMF (dimethylformamide), DMA (dimethylacetamide), dioxane, and THF.

M, $L^1$, $L^2$, S, a, b, c, and x can be combined in various ratio to control the color of the compound. For example, the number of phenylene in $L^1$ and $L^2$ may contribute to the changes in wavelength and intensity of the emission spectra. In some embodiments, M, $L^1$, $L^2$, S, a, b, c, and x are so combined that the compound comprises a crystalline 3-dimensional framework having characteristics of yellow phosphors and capable of emitting white light upon irradiation by a blue light.

In some embodiments, $L^1$ is selected from tcbpe, tcbpe-F, tcbpe-CH$_3$, tctpe, tcpe, tcbpe-NH$_2$, ttzbpe, and derivatives thereof; and $L^2$ is selected from 4,4'-bpy, bpee, bpe, and derivatives thereof.

In some embodiments, the repeating unit of Formula I is represented as $M_2(L^1)$.xDMA (Formula II). M can be selected from Zn, Cd, and Zr. X is 0 or an integer. $L^1$ is selected from tcbpe, tcbpe-F, ttzbpe, and tctpe.

In some embodiments, the repeating unit of Formula I is represented as $M_2(L^1)$.xDMA. M is Zn and $L^1$ is tcbpe. Each Zn atom is tetrahedrally coordinated to O atoms from four different tcbpe ligand. All the carboxylate groups of tcbpe are bidentate with each O atom coordinating to a different Zn atom. Two adjacent Zn atoms form an eight-membered ring with carboxylate groups from the ligand. The overall framework is three-dimensional (3D) with 1D channel along the c axis.

In some embodiments, the repeating unit has a formula of $M_a(L^1)_b(tppe)_c$.xS (Formula III), wherein M is Zn, Cd, or Zr; b is greater than 0; and $L^1$ is a bi-carboxylate or tri-carboxylate ligand selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diypdibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and derivatives thereof.

In some embodiments of Formula III, the compound comprises a primary building unit (PBU) and a paddle-wheel based secondary building unit (SBU), wherein M is Zn; the PBU comprises an octahedrally coordinated zinc metal connected to four oxygen atoms in two carboxylate groups from two different $L^1$ ligands and two N atoms from two different tppe ligands; each zinc atom of the SBU bonds to four carboxylate oxygen atoms from four $L^1$ ligands and an O atom from the solvent molecule S; and S is DMA.

In some embodiments of Formula III, two types of building units PBU and SBU are connected by the $L^1$ ligand, forming a 3D net, and two identical nets interpenetrate to for a 3D framework.

In some embodiments, the $L^1$ ligand is btc. In some embodiments, Formula III is represented by $M_6(btc)_4(tppe)_2$.2DMA].11DMA wherein M is Zn or Cd. In some embodiments, Formula III is $Zr_3(btc)_4(tppe)_c$, wherein c is 1 or 2.

Figure 1B:
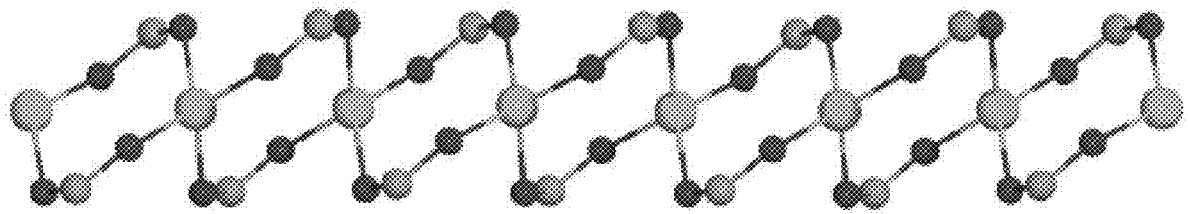
FIG. 1(b) illustrates the secondary building unit of Compound 1 with a chained formed by coordinated $Zn^{2+}$.
Figure 1C:
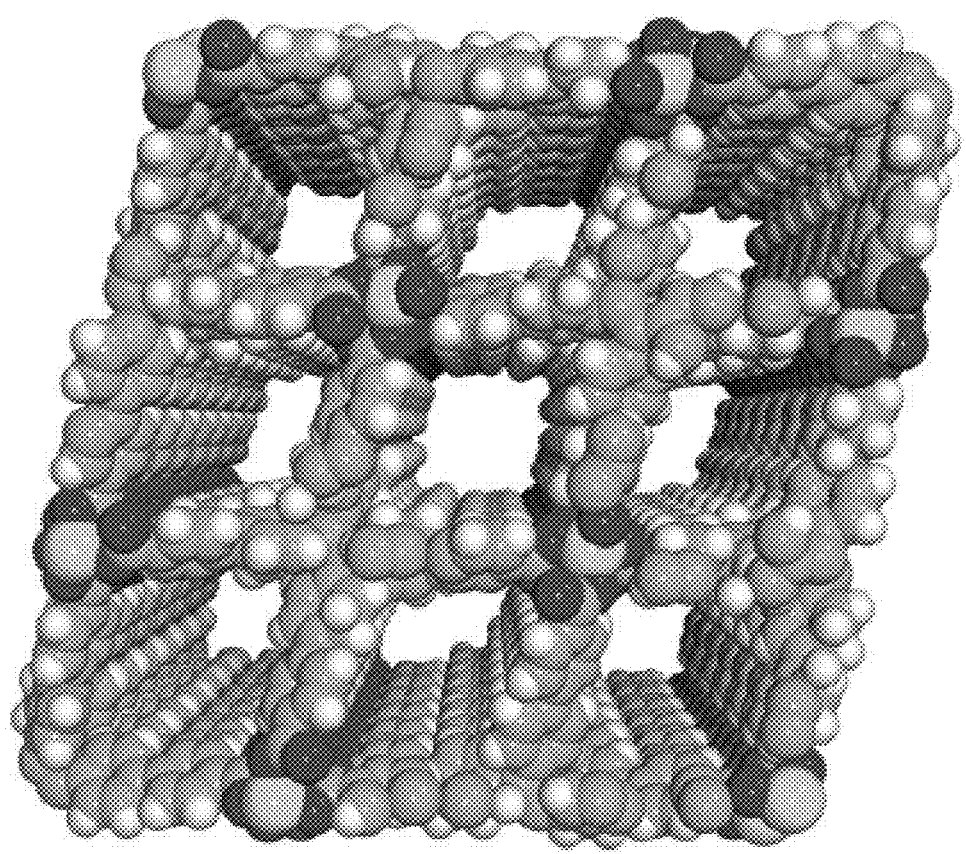
FIG. 1(c) illustrates the overall 3D framework of Compound 1.
Figure 2A:
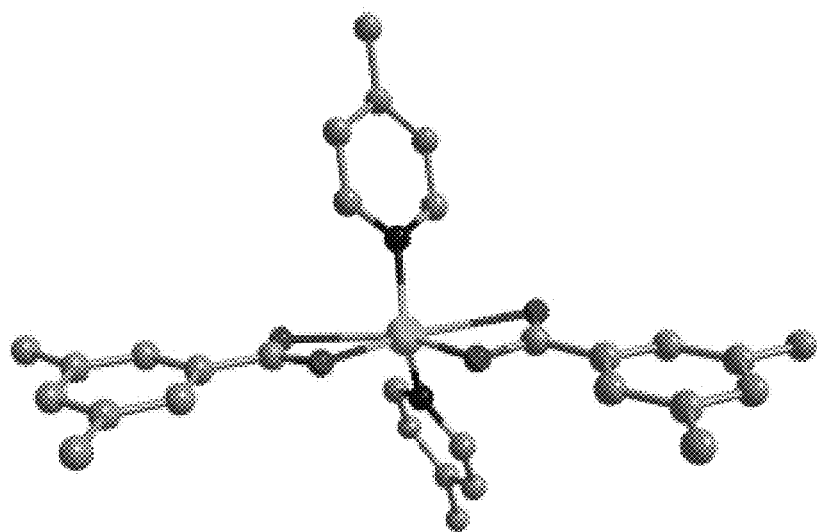
FIG. 2(a) illustrates the primary building unit of Compound 2.
Figure 2B:
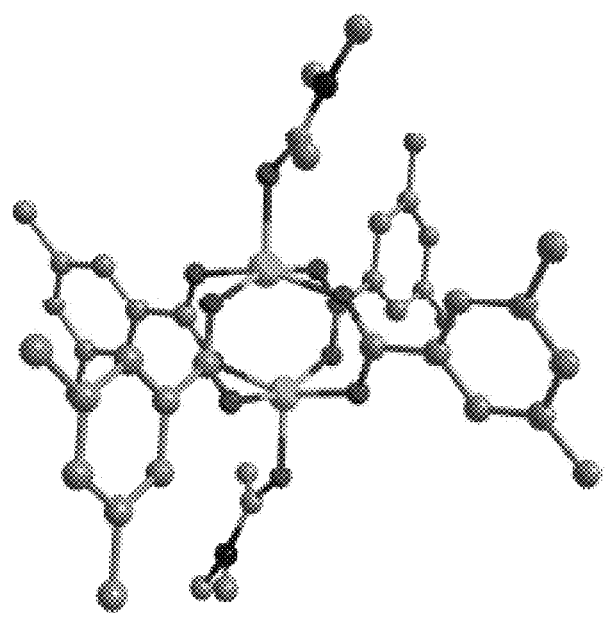
FIG. 2(b) illustrates the secondary building unit of Compound 2.
Figure 2C:
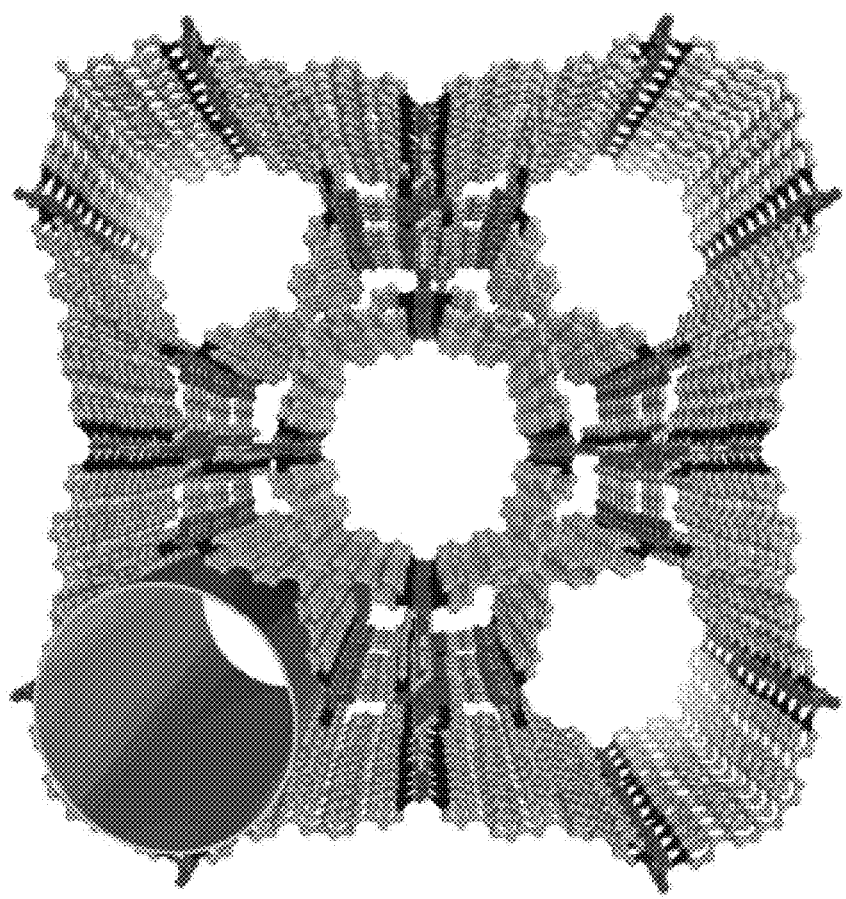
FIG. 2(c) illustrates the overall 3D framework viewed along the [100] axis of Compound 2.
Figure 2D:
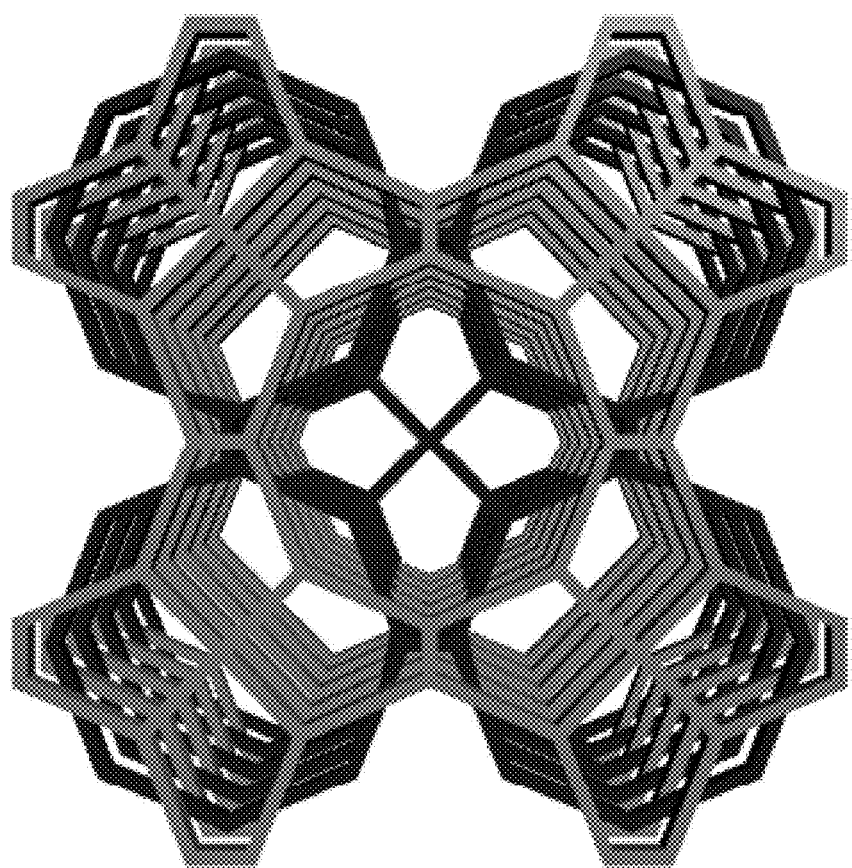
FIG. 2(d) illustrates the topological net of Compound 2.

In some embodiments, the LMOFs comprise Zn metal and one or two ligands. In the case of one ligand, the emission will primarily be ligand based, and in the case of two ligands, different combinations may exist, e.g., (a) both ligands are emissive, (b) they contribute differently in the HOMO and LUMO of the resultant LMOF, or (c) one of them is highly emissive with a high-lying HOMO and the other, non-emissive with a low-lying LUMO. In the latter case, a ligand-to-ligand charge transfer (LLCT) will most likely lead to a strong emission at lower energy. In some embodiments, tetra(4-(pyrid-4-yl)phenyethylene (4-tppe or tppe) and 4',4''',4''''',4'''''''-(ethene-1,1,2,2-tetrayl)tetrakis([1,1'-biphenyl]-4-carboxylic acid) (tcbpe) are selected as they emit strongly in yellow and green region, respectively (510 and 548 nm) under ultraviolet radiation. The new MOFs are synthesized by solvothermal reactions. Single crystal X-ray diffraction analysis reveals that they crystallize in monoclinic (C2/c) and triclinic (P-1(2)) space groups with a general formula $Zn_2(tcbpe)$.xDMA (1.xDMA, DMA=dimethylacetamide) and $[Zn_6(btc)_4(tppe)_2$.2DMA].11DMA (2.11DMA, H$_3$btc=benzene-1,3,5-tricarboxylic acid). Each Zn atom in Compound 1 (LMOF-231) is tetrahedrally coordinated to O atoms from four different tcbpe ligand (FIG. 1a). All the carboxylate groups are bidentate with each O atom connecting a different Zn atom. Two adjacent Zn atoms form an eight-membered ring with carboxylate groups from the ligand, which is in its chair confirmation (FIG. 1b). The overall framework is three-dimensional (3D) with 1D channel along the c axis (FIG. 1c). Compound 2 (LMOF-251) is a two-fold interpenetrated three-dimensional (3D) framework. The structure is built on two different building units: a primary building unit (PBU) and a paddle-wheel based secondary building unit (SBU), as shown in FIGS. 2a and 2b. The octahedrally coordinated zinc metal in the PBU is connected to four oxygen atoms in two carboxylate groups from two different btc ligands and two N atoms from two different tppe ligands. Each zinc atom of the SBU bonds to four carboxylate oxygen atoms from four btc linkers and an O atom from DMA solvent molecule. The two types of building units are connected by the btc linkers, forming a 3D net. Two such identical nets interpenetrate to give rise to the overall 3D framework (FIGS. 2c and 2d).

The rare-earth-free MOF yellow phosphors like compounds 1 and 2 can be effectively excited by blue light and assembled in a WLED device with a blue chip. They exhibit significantly enhanced emission intensity compared to the constituent ligand and have the highest quantum yield among all white and yellow emitting hybrid phosphors (including MOFs) reported to date. In addition, high thermal and moisture stability of both the crystal structure and photoluminescence are achieved. A solution processing procedure is developed for use in fabricating flexible light fixtures. The exceptionally high performance of this compound makes it an outstanding candidate for use as an alternate yellow phosphor in white LEDs.

Article of Manufacture

Another aspect of the invention provides an article of manufacture comprising one or more of the above described compounds. Non-limiting embodiments of the article of manufacture include a lighting device, a display, or anything that contain compounds of the present invention as a coating or a decoration. For example, a sign plate may have one or more compounds coated on the surface in a pattern. When exposed to a light source of suitable wavelengths, the plate may display a pattern in one or more desirable colors. The article of manufacture may also be a lighting device comprising a bulb coated with one or more compounds of the present invention. Suitable exciting wavelengths allow for illumination in desirable colors. The coating may be in any pattern such as stripes, circles and characters.

In some embodiments, the article of manufacture is a light emitting device having a light source capable of producing an exciting wavelength in the range of about 300-750 nm, all sub-units and sub-ranges included. The variable exciting wavelengths allow for emission of different color, excitation of compounds of different composition, and display of different patterns. The exciting wavelengths may be produced simultaneously or sequentially. Non-limiting examples of the exciting wavelengths include about 300, 320, 340, 3360, 380, 400, 420, 440, 460, 480, 500, 520, 540, 560, 580, 600, 620, 640, 660, 680, and 700 nm.

The light emitting device may include a light source such as a UV lamp, a light-emitting diode (LED), or a laser. In some embodiments, the light emitting device is an LED. In some embodiments, the LED is capable of producing an exciting wavelength of about 400-500 nm, all sub-units and sub-ranges included. Non-limiting examples include about 410-420, 420-430, 430-440, 440-450, 450-455, 455-460, 460-465, and 465-470 nm. Further examples include about 410, 420, 430, 440, 445, 450, 455, 460, 465, 470, 475, 480, 485, 490, 495 and 500 nm.

Various colors can be emitted by compounds of the present invention. Non-limiting examples of the wavelengths include from about 350-750 nm, all subunits and sub-ranges included. In some embodiments, the compound emits a white color.

The article of manufacture may contain any compound of Formula I of the present invention. In some embodiments, the compound contains repeating units having the formula of $M_2(L^1) \cdot xDMA$, wherein M is selected from Zn, Cd, and Zr; x is 0 or an integer; and $L^1$ is selected from tcbpe, tcbpe-F, ttzbpe, and tctpe. In some embodiments, compound contains repeating units having the formula of $M_a(L^1)_b(tppe)_c \cdot xS$ wherein M is Zn; S is DMA; and $L^1$ is selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diyl)dibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and derivatives thereof.

Method of Lighting

Another aspect of the present invention provides a method of producing a light comprising exposing the compound of the present invention to a suitable exciting wavelength. Non-limiting embodiments of the exciting wavelength range about 300-750 nm, all subunits and sub-ranges included as described above. The actual wavelength to be used depends on the compound and the desirable color of light to be emitted. In some embodiments, the exciting wavelength is about 400-700 nm. In some embodiments, the exciting wavelength is about 430-400 nm. In some embodiments, the light source is an LED having an exciting wavelength of about 455-460 nm and leads to the emission of a white light.

Method of Production

Another aspect of the invention provides a method of producing the above described compound. In general, the method comprises (a) mixing a salt of M with $L^1$ and optionally $L^2$ in an organic solvent; and (b) heating the mixture at a temperature for a sufficient time to obtain the compound. The mixture is optionally sonicated to promote distribution of the starting materials.

Various salts of M can be used in the preparation. Non-limiting examples of counter ions (anions) of the salt include nitrates, sulfates, and chlorides. As a starting material, the salt may be solvated with for example water.

Suitable organic solvents include for example dimethylformamide (DMF), dimethylacetamide (DMA), dioxane and other solvents capable of coordinating to M. In some embodiments, the solvent is DMA.

Heating can be provided by regular thermal heating or microwave heating. The temperature and length in time of heating depend on the specific compound to be prepared and can be readily modified by one or ordinary skill in the art without undue experiments. In some non-limiting exemplary embodiments, the temperature is about 50-500° C., all subunits and sub-ranges included. Examples include of the temperature include about 80, 100, 150, 200, 250, 300, 350 and 400° C. Non-limiting embodiments for the length of heating vary from about 5 seconds to about 5 days. Examples of the length in time include about 1, 5, 10, 20, 25, 30, 40, and 50 hours.

The following non-limiting examples set forth herein below illustrate certain aspects of the invention.

EXAMPLES

1. A Computational Screening of Fluorescent Ligands

The emission properties of a series of organic molecules were evaluated computationally using the density functional theory (DFT). Calculations were performed with Guassian 09 suite of programs. The B3LYP[2-4] hybrid functional and DGDZVP basis set were applied. The corrected band gaps ($E_{cor.}$) were based on the experimental band gap of tcbpe. From Table 2, possible yellow emitting candidates are tcbpe, tcbpe-F, ttzbpe, and tctpe.

TABLE 2

A computational study of emission properties of potential ligands

| Method Basis Set Ligand | B3LYP DGDZVP | | | Corrected | Estimated Emission |
| --- | --- | --- | --- | --- | --- |
| | HOMO (eV) | LUMO (eV) | $\Delta E$ (eV) | $\Delta E_{cor}$ (eV) | $\lambda_{em}$ (nm) |
| 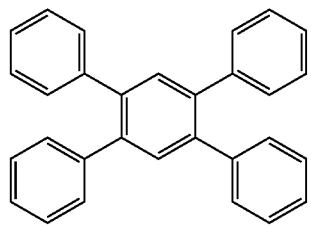 tpb | −5.98 | −1.35 | 4.63 | 3.63 | 342 |

TABLE 2-continued
A computational study of emission properties of potential ligands
| Method<br>Basis Set<br>Ligand | B3LYP<br>DGDZVP | | | Corrected | Estimated Emission |
|---|---|---|---|---|---|
| | HOMO (eV) | LUMO (eV) | $\Delta E$ (eV) | $\Delta E_{cor}$ (eV) | $\lambda_{em}$ (nm) |
| 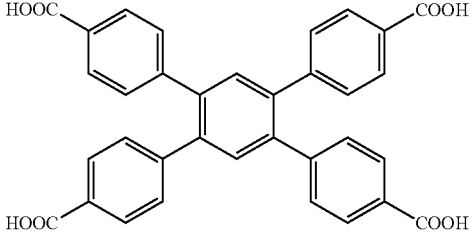<br>tcpb | −6.66 | −2.45 | 4.21 | 3.21 | 386 |
| 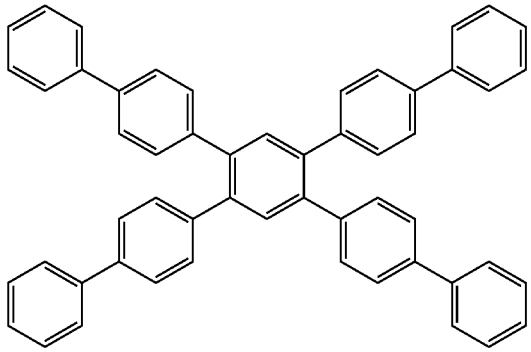<br>tbpb | −5.77 | −1.64 | 4.13 | 3.13 | 396 |
| 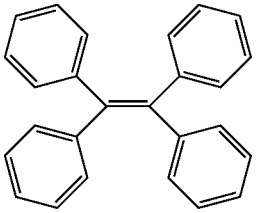<br>tpe | −5.60 | −1.52 | 4.08 | 3.08 | 403 |
| 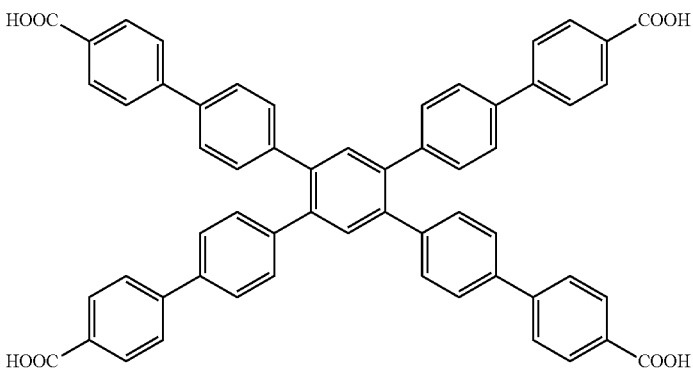<br>tcbpb | −6.17 | −2.29 | 3.88 | 2.88 | 430 |

TABLE 2-continued
A computational study of emission properties of potential ligands
| Method<br>Basis Set<br>Ligand | B3LYP<br>DGDZVP | | | Corrected | Estimated Emission |
|---|---|---|---|---|---|
| | HOMO (eV) | LUMO (eV) | $\Delta E$ (eV) | $\Delta E_{cor}$ (eV) | $\lambda_{em}$ (nm) |
| 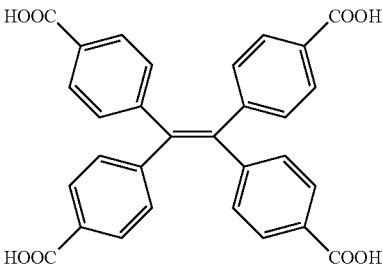<br>tcpe | −6.40 | −2.68 | 3.72 | 2.72 | 456 |
| 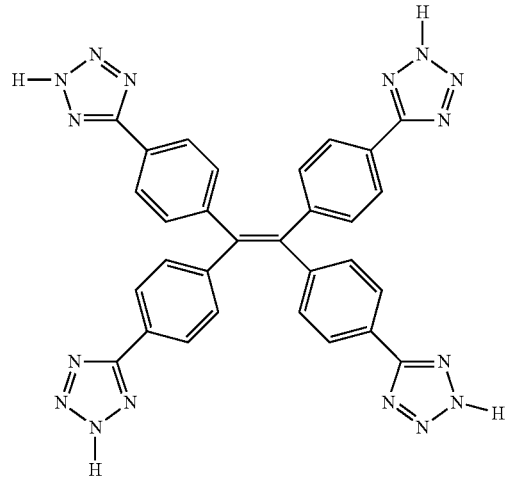<br>ttzpe | −5.85 | −2.26 | 3.59 | 2.59 | 479 |
| 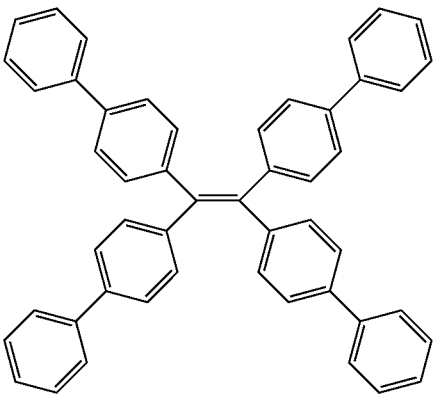<br>tbpe | −5.43 | −1.84 | 3.59 | 2.59 | 479 |

TABLE 2-continued
A computational study of emission properties of potential ligands
| Method<br>Basis Set<br><br>Ligand | B3LYP<br>DGDZVP | | | Corrected | Estimated<br>Emission |
|---|---|---|---|---|---|
| | HOMO<br>(eV) | LUMO<br>(eV) | ΔE<br>(eV) | ΔE$_{cor}$<br>(eV) | λ$_{em}$<br>(nm) |
| 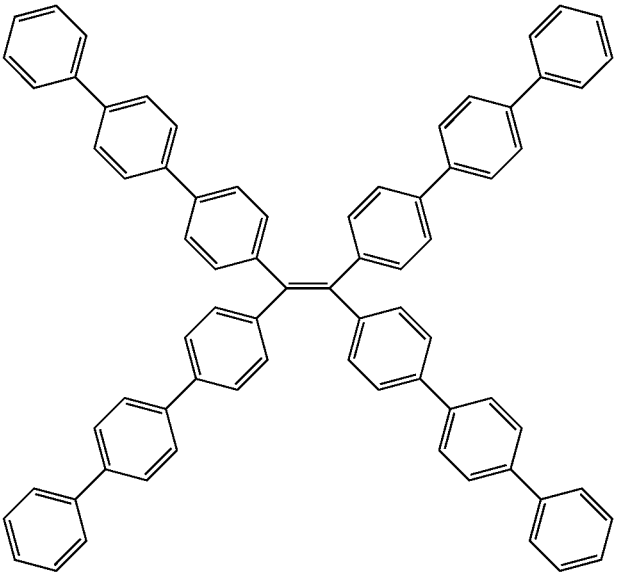<br>ttpe | −5.40 | −1.93 | 3.47 | 2.47 | 502 |
| 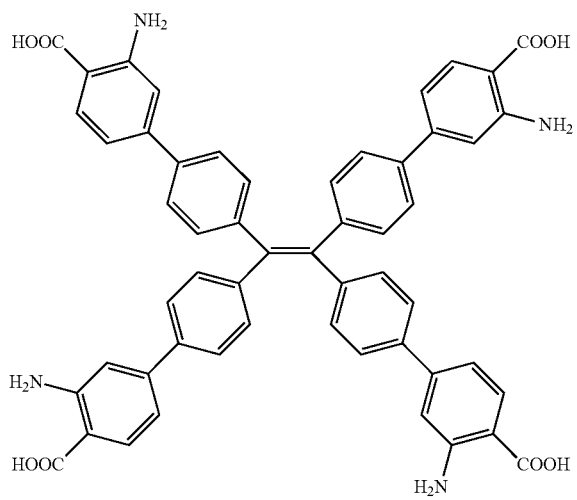<br>tcbpe-NH$_2$ | −5.70 | −2.25 | 3.46 | 2.46 | 505 |

TABLE 2-continued
A computational study of emission properties of potential ligands
| Method Basis Set Ligand | B3LYP DGDZVP | | | Corrected | Estimated Emission |
|---|---|---|---|---|---|
| | HOMO (eV) | LUMO (eV) | ΔE (eV) | ΔE$_{cor}$ (eV) | λ$_{em}$ (nm) |
| tcbpe-F | −6.10 | −2.68 | 3.42 | 2.42 | 512 |
| ttzbpe | −5.60 | −2.18 | 3.42 | 2.42 | 513 |
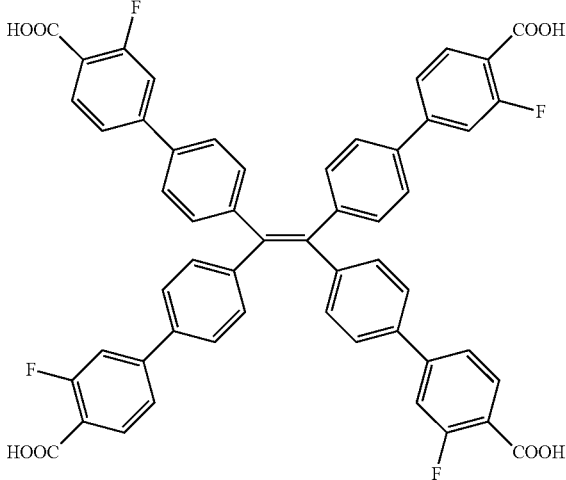
tcbpe-F
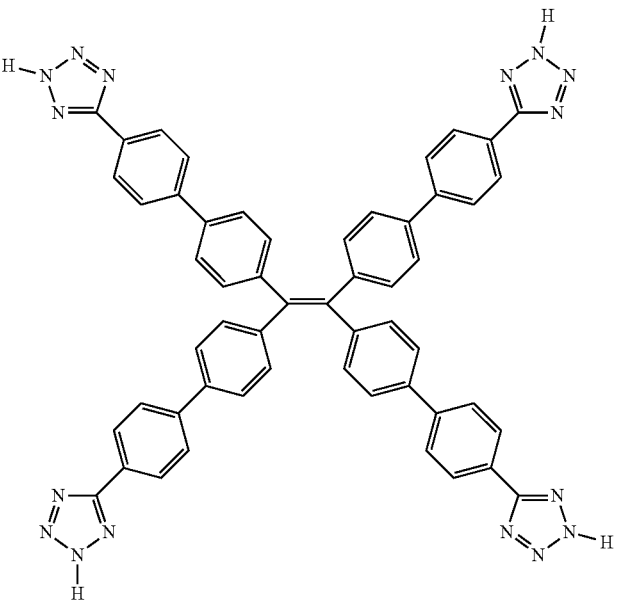
ttzbpe TABLE 2-continued
A computational study of emission properties of potential ligands
| Method<br>Basis Set<br>Ligand | B3LYP<br>DGDZVP | | | Corrected | Estimated<br>Emission |
|---|---|---|---|---|---|
| | HOMO (eV) | LUMO (eV) | ΔE (eV) | ΔE$_{cor}$ (eV) | λ$_{em}$ (nm) |
| 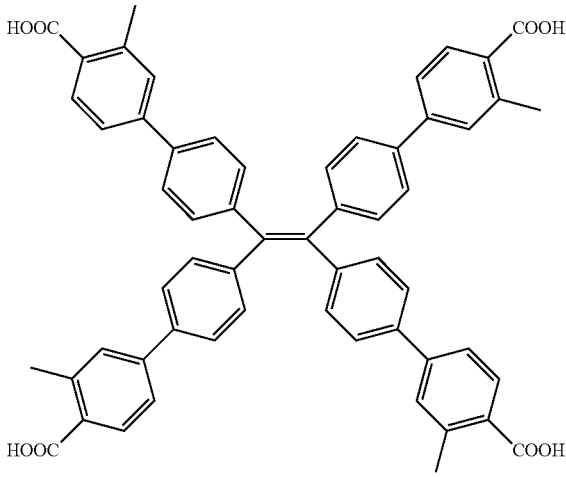 tcbpe-CH₃ | −5.80 | −2.39 | 3.41 | 2.41 | 514 |
| 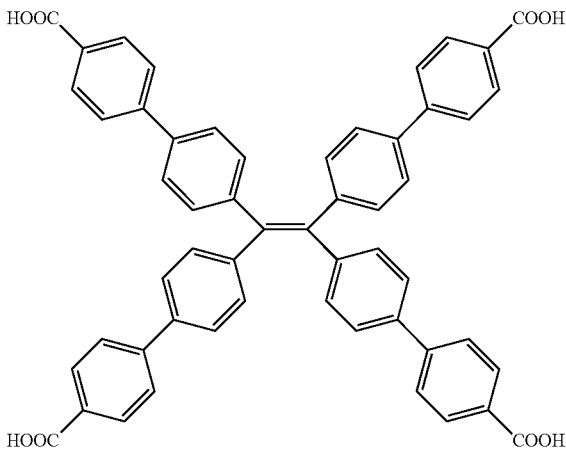 tcbpe | −5.87 | −2.46 | 3.41 | 2.40 | 517 |

TABLE 2-continued

A computational study of emission properties of potential ligands

| Method Basis Set Ligand | B3LYP DGDZVP | | | Corrected | Estimated Emission |
|---|---|---|---|---|---|
| | HOMO (eV) | LUMO (eV) | $\Delta E$ (eV) | $\Delta E_{cor}$ (eV) | $\lambda_{em}$ (nm) |

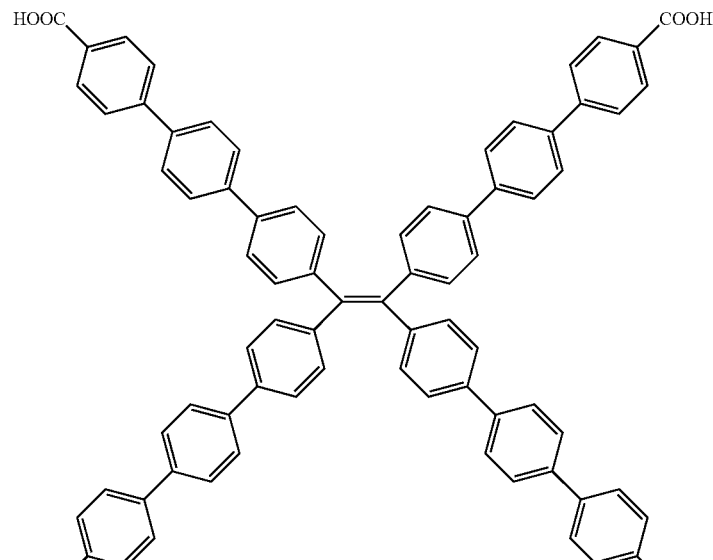

tctpe · −5.65 · −2.31 · 3.34 · 2.34 · 530

2. The Synthesis of Ligands

The general synthesis of tpe-based ligand can be found in Scheme 1. The starting material, tpe-Br is synthesized according to a reported method (V. S. Vyas, M. Banerjee and R. Rathore, *Tetrahedron Letters*, 2009, 50, 6159-6162).

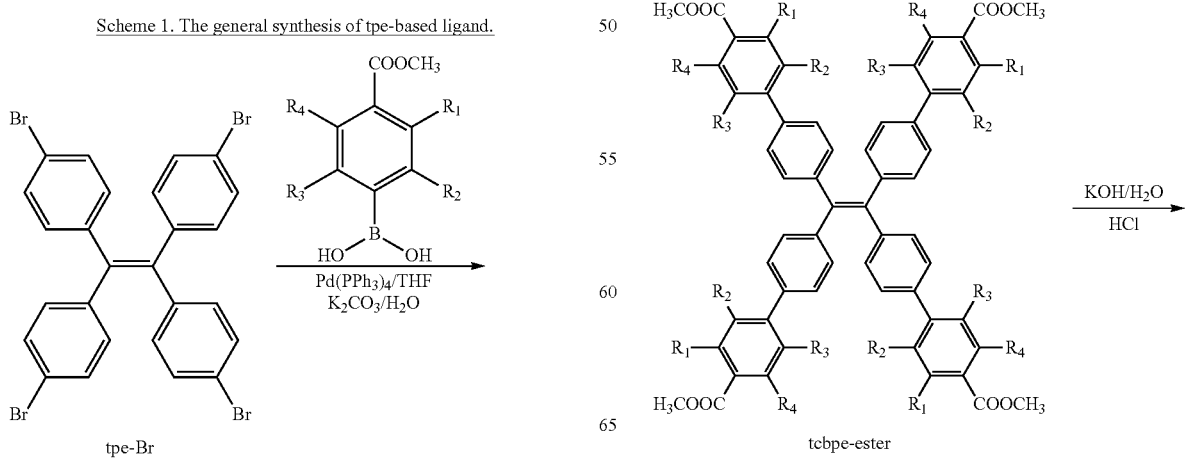

Scheme 1. The general synthesis of tpe-based ligand.

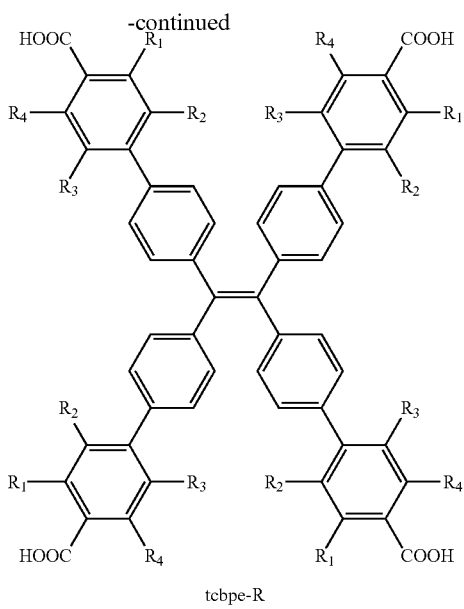

tcbpe-R $R_1, R_2, R_3, R_4$ = H, F, $CH_3$, or $NH_2$

Synthesis of tcbpe ($R_1$ to $R_4$=H in Scheme 1)

To a 250 mL three-neck flask, tetra-(4-bromo-phenyl) ethylene (tpe-Br, 2.85 g, 4.4 mmol), 4-(methoxycarbonyl) phenylboronic acid (5.00 g, 27.8 mmol) and Pd(PPh$_3$)$_4$ (0.20 g) were added, then THF (tetrahydrofuran, 100 mL) and K$_2$CO$_3$ aqueous solution(3.0 M, 15 mL) were added under nitrogen protection at room temperature, the mixture solution was kept at 90° C. for 3 days. After cooling to room temperature, the reaction solution was extracted with dichloromethane for three times. The organic phase was washed with water, dried with anhydrous magnesium sulfate and then subject to flash chromatography using dichloromethane as fluent. The product tcbpe-ester was obtained as green-yellow solid in 63.6% yield (2.43 g). $^1$H NMR (400 MHz, CDCl$_3$) 8.07 (d, 8H, J=8.1 Hz), 7.64 (d, 8H, J=8.0 Hz), 7.45 (d, 8H, J=7.9 Hz), 7.21 (d, 8H, J=8.0 Hz), 3.93 (s, 12H); $^{13}$C NMR (100 MHz, CDCl$_3$) 167.1, 145.0, 143.6, 140.8, 138.2, 132.2, 130.2, 129.0, 126.9, 52.3; MS (EI): calcd. for C$_{58}$H$_{44}$O$_8$: 868.3036. Found, 868 (M$^+$). Anal. Calcd for C$_{58}$H$_{44}$O$_8$: C, 80.17%; H, 5.10%. Found: C, 79.81%; H, 5.37%.

The tcbpe-ester (2.43 g, 2.8 mmol) was dissolved in THF (30 mL) and then conc. KOH solution (3M, 30 mL) was added. The mixture was refluxed for more than 4 h. After the reaction completed, the solution was cooled to room temperature and concentrated under reduced pressure. The concentrated solution was acidified with conc. HCl to form precipitate. The mixture was cooled and vacuum filtered and the precipitate was washed with water and dried. The product was obtained as yellow powder in 90.5% yield (2.06 g). $^1$H NMR (400 MHz, DMSO-d6) 12.96, 7.97 (d, 8H, J=7.7 Hz), 7.77 (d, 8H, J=7.7 Hz), 7.62 (d, 8H, J=7.6 Hz), 7.20 (d, 8H, J=7.6 Hz); $^{13}$C NMR (100 MHz, DMSO-d6) 167.1, 143.4, 143.1, 140.2, 137.1, 131.6, 129.9, 129.6, 126.5; MS (MALDI-TOF): calculated. for C$_{54}$H$_{36}$O$_8$: 812.2410. Found, 812.7 (M$^+$). Anal. Calcd for C$_{54}$H$_{36}$O$_8$: C, 79.79%; H, 4.46%. Found: C, 79.91%; H, 4.38%.

Synthesis of tcbpe-F ($R_1$=F, $R_2$ to $R_4$=H in Scheme 1)

To a 250 ml three-neck flask, tetra-(4-bromo-phenyl) ethylene (tpe-Br, 2.71 g, 4.2 mmol), 3-fluoro-4-(methoxycarbonyl)phenylboronic acid (5.00 g, 25.2 mmol) and Pd(PPh$_3$)$_4$ (0.40 g) were added, then THF (100 mL) and K$_2$CO$_3$ aqueous solution (3.0M, 15 mL) were added under nitrogen protection at room temperature. The mixture solution was kept at 90° C. for three days. After cooling to room temperature, the reaction solution was extracted with dichloromethane for three times (100 mL×3). The organic phase was washed with water, dried with anhydrous magnesium sulfate. The crude mixture was purified by flash chromatography using dichloromethane/methanol (V:V=40:1) as fluent. The product, tcbpe-F-ester, was obtained as green-yellow solid in 63.3% yield (2.50 g). $^1$H NMR (400 MHz, CDCl$_3$) δ: 7.90 (t, J=10.8 Hz), 7.36 (d, 8H, J=11.2 Hz), 7.28 (m, 8H), 7.12 (d, 8H, J=11.2 Hz), 3.87 (s, 12H).

The tcbpe-F-ester (2.50 g, 2.65 mmol) was dissolved in THF (30 mL) and then conc. KOH solution (3M, 30 mL) was added. The mixture was refluxed overnight. After the reaction completed, the solution was cooled to room temperature and concentrated under reduced pressure. The concentrated solution was acidified with conc. HCl to form precipitate. The mixture was cooled and vacuum filtered and the precipitate was washed with water and dried. The product tcbpe-F was obtained as yellow powder in 92.3% yield (2.17 g), $^1$H NMR (400 MHz, DMSO-d$_6$) δ: 13.26, 7.95 (t, 4H, J=10.8 Hz), 7.72 (d, 8H, J=11.2 Hz), 7.66 (m, 8H), 7.23 (d, 8H, J=11.2 Hz), MS (ESI) m/z: 882.9 (M-H$^+$).

3. The Synthesis of LMOFs

The solvothermal method was used to synthesize luminescent metal-organic frameworks (LMOFs) as demonstrated in Scheme 2.

Scheme 2. Synthesis of LMOFs.

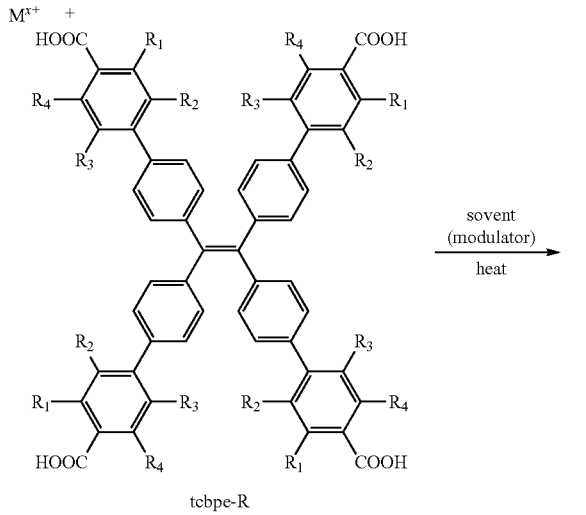

tcbpe-R

LMOF $R_1, R_2, R_3, R_4$ = H, F, CH$_3$, or NH$_2$
$M^{x+}$ = Zn$^{2+}$, Cd$^{2+}$, Zr$^{4+}$
solvent = DMF, DMA, DEF, DMSO, EtOH, and mixture of the aformentioned solvents
modulator (optional) = acetic acid, benzoic acid, HBF$_4$ (a) Synthesis of $Zn_2$(tcbpe).xDMA (LMOF-231 or 1)

To a 20 mL glass vial, $Zn(NO_3)_2.6H_2O$ (0.0892 g, 0.30 mmol), tcbpe (0.0244 g, 0.03 mmol), and N,N'-dimethylacetamide (DMA, 2 mL) were added. The glass vial was capped and sonicated at room temperature for a few minutes until a clear solution was obtained. The sealed glass vial was kept at 120° C. for 48 hours. Transparent light yellow single crystals were harvested through filtration, washed with DMA, and dried in air (~80% yield based on tcbpe), which were analyzed by microscope, and thermal gravimetric analysis, and single crystal X-ray (Table 2) and powder X-ray diffractions.

(b) Synthesis of $Zr_x$(tcbpe).yDMF (LMOF-232)

To a 20 mL glass vial, $ZrCl_4.6H_2O$ (0.0350 g, 0.15 mmol) and acetic acid (0.69 mL, 12 mmol) were added. The mixture was sonicated to afford a clear solution. Then tcbpe (0.0244 g, 0.03 mmol), and N,N'-dimethylformamide (DMF, 4 mL) were added. The glass vial was capped and sonicated again at room temperature for a few minutes until a clear solution was obtained. The sealed glass vial was kept at 120° C. for 48 hours. Yellowish powder was harvested through filtration, washed with DMF, and dried in air, which was analyzed by powder X-ray diffraction and thermal gravimetric analysis.

(c) Synthesis of $Zr_x$(tcbpe)$_y$.zDMA (LMOF-233)

To a 20 mL glass vial, $ZrCl_4.6H_2O$ (0.0350 g, 0.15 mmol) and acetic acid (0.69 mL, 12 mmol) were added. The mixture was sonicated to afford a clear solution. Then tcbpe (0.0244 g, 0.03 mmol), and DMA (4 mL) were added. The glass vial was capped and sonicated again at room temperature for a few minutes until a clear solution was obtained. The sealed glass vial was kept at 120° C. for 48 hours. Yellowish powder was harvested through filtration, washed with DMA, and dried in air, which was analyzed by powder X-ray diffraction and thermal gravimetric analysis.

(d) Synthesis of $Zr_x$(tcbpe)$_y$.zDEF (LMOF-234)

To a 20 mL glass vial, $ZrCl_4.6H_2O$ (0.0350 g, 0.15 mmol) and acetic acid (0.69 mL, 12 mmol) were added. The mixture was sonicated to afford a clear solution. Then tcbpe (0.0244 g, 0.03 mmol), and N,N'-diethylformamide (DEF, 4 mL) were added. The glass vial was capped and sonicated again at room temperature for a few minutes until a clear solution was obtained. The sealed glass vial was kept at 120° C. for 48 hours. White powder was harvested through filtration, washed with DEF, and dried in air, which was analyzed by powder X-ray diffraction thermal gravimetric analysis.

(e) Single Crystal X-Ray Diffraction Analysis

Synchrotron X-ray sources at the Advanced Light Source 11.3.1 Chemical Crystallography beam line were used to collect low temperature (100 K) single crystal diffraction data for LMOF-231. Reflection data for compound 1 were collected using a three-circle Bruker D8 diffractometer equipped with an APEXII detector (λ=0.77490 Å) with 180 co scans, at 0.3 steps, with settings of ϕ=0, 120, and 240. The crystals were twinned; CELL NOW[8] was used to determine the two orientation matrices of the two components. SAINT8.27B[9] was used to integrate the intensities for both components. At the same time, the raw data in the APEXII suite of programs were corrected for absorption effects using TWINABS. The parameters are listed in Table 3.

TABLE 3

| Single crystal data for LMOF-231 at 100 K | |
|---|---|
| Compound | $Zn_2$(tcbpe)•xDMA (LMOF-231) |
| Formula | $C_{54}H_{31}O_8Zn_2$ |
| M | 938.81 |
| Crystal system | Monoclinic |
| Space group | C 2/c |
| a/Å | 36.929(5) |
| b/Å | 31.080(4) |
| c/Å | 11.8533(17) |
| α/o | 90.00 |
| β/o | 99.228(2) |
| γ/o | 90.00 |
| V, Å$^3$ | 13429(3) |
| Z | 8 |
| Temperature (K) | 100(2) |
| □□(radiation wavelength) Å | 0.77490 |
| D, g/cm$^3$ | 0.929 |
| Reflections collected | 18590 |
| R1$^a$ [I > 2σ(I)] | 0.0767 |
| wR2$^b$ [I > 2σ(I)] | 0.2534 |
| Goodness-of-fit | 1.164 |

$^a$R1 = Σ|F$_o$ − F$_o$|/Σ|F$_o$|
$^b$wR2 = Σ[w(F$_o$$^2$ − F$_o$$^2$)$^2$]/w(F$_o$$^2$)$^2$]$^{1/2}$

4. Pore Characterization

Gas sorption measurements were carried out on a volumetric gas sorption analyzer (Autosorb-1 MP, Quantachrome Instruments). Ultra high purity N2 (99.999%) was used for the experiment. Cryogenic temperature (77K) was achieved by using liquid nitrogen as coolant. About 120 mg as made sample was outgassed at 423 K overnight under dynamic vacuum and the subsequent degassed sample was used for the gas sorption experiment. The N2 isotherm was collected in a pressure range from $10^{-7}$ to 1 atm at 77K. Surface area was analyzed using Autosorbv1.50 software. The BET surface are for LMOF-231' (the ourgassed LMOF-231) is 833 m$^2$/g.

5. Optical Absorption and Fluorescence Spectroscopy

The diffuse reflectance of solid samples were collected on a Shimathu UV-3600 spectrophotometer at room temperature with a $BaSO_4$ standard as the baseline. The diffuse reflectance was converted to Kubelka-Munk Function as shown below. The photoluminsecence (PL) study was conducted on a Varian Cary Eclipse spectrophotometer. Measurements were taken on solid samples. For optional absorption, fluorescence spectroscopy and other related measurements of the materials prepared.

6. Quantum Yield Measurement

The quantum yields of ligands and LMOFs were measured on a Hamamatsu C9220-03 system. Solids samples were used for all measurements. See Table 4.

TABLE 4

A summary of quantum yields. Vacuum was applied while heating. Emission wavelength was acquired on Hamamatsu system.

| Sample name | Excitation (Emission) wavelength (nm) | Quantum yield (%) for yellow emission | QY (%) after heating at 150° C. for 12 hrs | QY decrease (%) |
|---|---|---|---|---|
| YAG:Ce | 455 (550) | 100.3 | | |
| tcbpe | 365 (544) | 117.3 | | |
| | 450 (548) | 82.8 | | |
| | 455 (548) | 78.8 | | |
| LMOF-231 | 360 (520) | 114.6 | | |
| | 455 (530) | 70.5 | | |
| LMOF-231' | 450 (550) | 81.2 | 59.8 | 21.4 |
| | 455 (550) | 77.4 | | |

7. A Summary of Carboxylic Acids for MOFs Built on 4-Tppe

The MOFs built on 4-tppe could be divided into two subgroups with tricarboxylic acids and dicarboxylic acids, respectively. A summary of the carboxylic acids used in the LMOFs built on 4-tppe is listed in Table 5.

TABLE 5

A summary of the carboxylic acids for LMOFs built on 4-tppe.

| Type of Carboxylic Acids | Ligand |
|---|---|
| Tricarboxylic Acids | benzene-1,3,5-tricarboxylic acid (H₃btc) |
| | 2-fluorobenzene-1,3,5-tricarboxylic acid (H₃btc-f) |
| | pyridine-2,4,6-tricarboxylic acid |
| | 2-aminobenzene-1,3,5-tricarboxylic acid |
| | 1,3,5-triazine-2,4,6-tricarboxylic acid |
| Dicarboxylic Acids | [1,1'-biphenyl]-4,4'-dicarboxylic acid (H₂bpdc) |
| | 4,4'-(perfluoropropane-2,2-diyl)dibenzoic acid (H₂hfipbb) |
| | 9-oxo-9H-fluorene-2,7-dicarboxylic acid (H₂ofdc) |

TABLE 5-continued

A summary of the carboxylic acids for LMOFs built on 4-tppe.

| Type of Carboxylic Acids | Ligand |
|---|---|
| | 9-(hydroxymethyl)-9H-fluorene-2,7-dicarboxylic acid |
| | 9H-fluorene-2,7-dicarboxylic acid |
| | 9-formyl-9H-fluorene-2,7-dicarboxylic acid |
| | terephthalic acid |
| | naphthalene-1,5-dicarboxylic acid |
| | naphthalene-1,4-dicarboxylic acid |
| | 4,4'-oxydibenzoic acid |
| | (E)-4,4'-(ethene-1,2-diyl)dibenzoic acid |
| | (E)-4,4'-(diazene-1,2-diyl)dibenzoic acid |

TABLE 5-continued

A summary of the carboxylic acids for LMOFs built on 4-tppe.

| Type of Carboxylic Acids | Ligand |
| --- | --- |
|  | 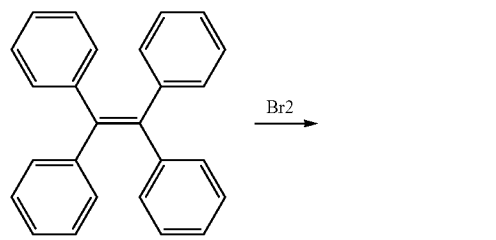<br>4,4'-sulfonyldibenzoic acid |

The Synthesis of Ligands

Synthesis of 4-tppe

The synthesis of 4-tppe is shown in Scheme 3.

Scheme 3. The synthesis of the 4-tppe ligand.

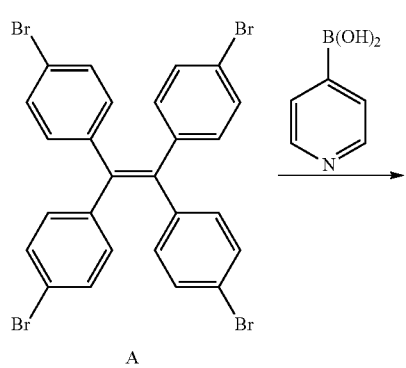

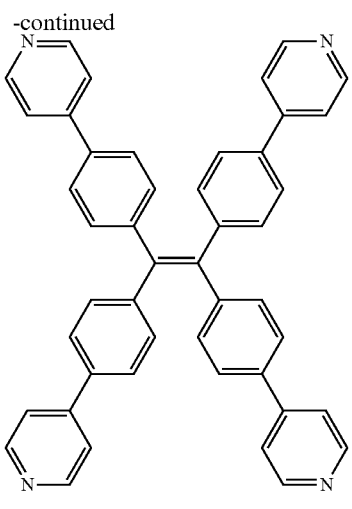

1) 1,1,2,2-tetrakis(4-bromophenyl)ethene (A). 75 mmol (25G) 1,1,2,2-tetraphenylethene was placed in a watch glass on the rack of a desiccator. 585 mmol (30 ml) bromide liquid was poured in the bottom of the desiccator. The desiccator was closed with a small hole leaving to release HBr formed from the reaction. After 7 days, the yellow solid was collected and recrystallized with dichloromethane/methanol (2:1) to give white crystals. Yield: 37 g, 76%. 1H NMR (CDCl3, 300 MHz, 298K): δ6.84 (d, 8H, HβArH), 7.26 (d, 8H, HαArH). Additional peaks: δ7.26 (m, CDCl$_3$), δ10.6 (m, H$_2$O).

2) 1,1,2,2-tetrakis(4-(pyridin-4-yl)phenyl)ethene (4-tppe) (B). 2.8 mmol (1.8 g) A, 16.68 mmol (2.05 g) pyridine-4-boronic acid, 0.93 mmol (207 mg) Pd(OAc)$_2$ were added into a 250 ml flask. 18.5 mmol (3.93 g) K$_3$PO$_4$ was dissolved in 5 ml water and then the solution was added into the same flask. 100 ml DMF and 1.38 mmol (390 mg) P(cy)$_3$ ware added in to the flask too. Blow N$_2$ into the system and reflux at 160° C. for 48 h. After cooling down to room temperature, the product was first vacuum evaporated and then extracted with chloroform for three times. The organic phase was then washed with water, dry with anhydrous magnesium sulfate. The final yellow powder product was purified by column with eluent of CH$_2$Cl$_2$: MeOH=30:1 with yield 50%. $^1$H NMR (CDCl3, 300 MHz, 298K): δ8.66 (br, 8H, H$_\alpha$—Py), 7.46-7.50 (m, 16H, ArH), 7.25 (br, 8H, H$_\beta$—Py). Additional peaks: δ7.26 (m, CDCl$_3$), δ1.6 (m, H$_2$O).

Synthesis of H$_3$btc-F

The synthesis of H$_3$btc-F can be found in Scheme 4.

Scheme 4. The synthesis of the H$_3$btc-F ligand.

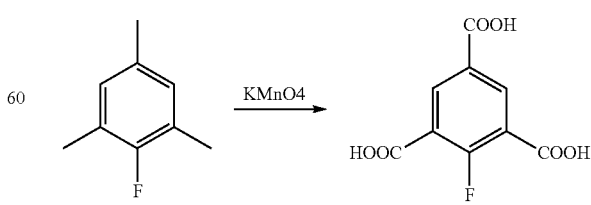

14.48 mmol (2 g) 2-fluoro-1,3,5-trimethylbenzene were emulsified in 106 ml boiling water. 67.4 mmol (10.64 g) of potassium permanganate were mixed with 45.55 mmol (5 g) sodium carbonate and added into the refluxing solution in 10 portions over a period of 72 h. The manganese (IV) oxide was removed by filtration and treated twice with 50 ml boiling water. The combined aqueous solutions were concentrated in vacuum to 60 ml and acidified with diluted hydrogen chloride up to pH=3.5 to give 1.5 g (6.57 mmol), yield 46% of a white powder. 1H NMR (D20, 300 MHz, 298 K): δ8.4 (d, 2H, ArH).

9. Synthesis of LMOFs

Figure 3:
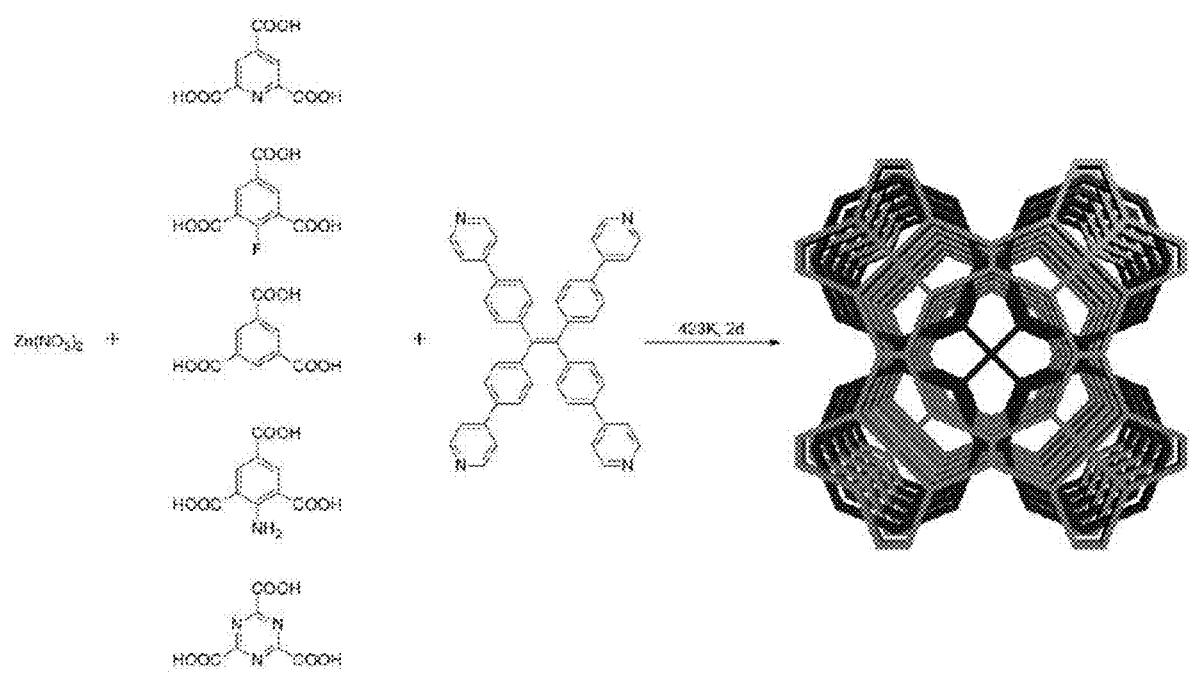
FIG. 3 illustrates the formation for LMOFs from the reaction involving $Zn(NO_3)_2$, tricarboxylic acid, and 4-tppe.
Figure 4:
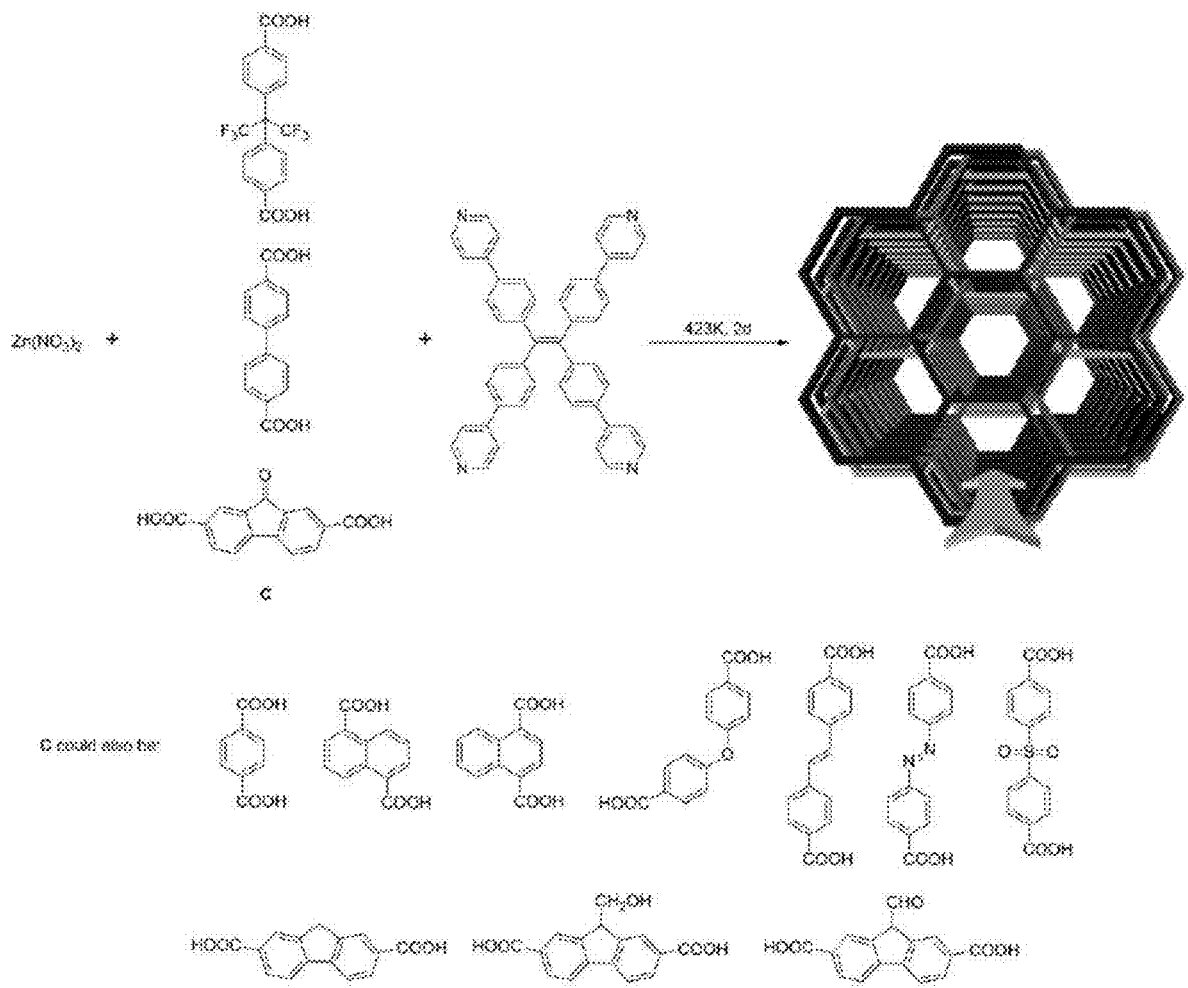
FIG. 4 illustrates the formation of LMOFs from $Zn(NO_3)_2$, dicarboxylic acids and 4-tppe.

The solvothermal method was used to synthesize luminescent metal-organic frameworks (LMOFs) as demonstrated in FIG. 3 and FIG. 4. FIG. 3 depicts the formation for LMOFs from the reaction involving $Zn(NO_3)_2$, tricarboxylic acid, and 4-tppe. FIG. 4 illustrates the formation of LMOFs from $Zn(NO_3)_2$, dicarboxylic acids and 4-tppe.

Synthesis of $[Zn_6(btc)_4(tppe)_2(DMA)_2]0.11DMA$ (LMOF-251 or 2)

0.060 mmol (18 mg) $Zn(NO_3)_2 \cdot 6H_2O$, 0.040 mmol (8.4 mg) $H_3btc$, 0.02 mmol (12.8 mg) 4-tppe were dissolved in 15 ml DMA in a glass vial. Then 0.3 ml $HBF_4$ was added into the vial. The capped vial was ultrasonicated until the solution was clear and then put into a 150° C. oven for 2 days. The needle shaped crystals were isolated and washed with 10 ml DMA for 3 times. The product was analyzed by microscope, single crystal X-ray diffraction (crystal structure illustrated in FIG. 2), powder X-ray diffraction, and thermal gravimetric analysis.

Synthesis of $[Zn.(btc-t)_y(tppe)_z(DMA).]nDMA$ (LMOF-252)

0.060 mmol (18 mg) $Zn(NO_3)_2 \cdot 6H_2O$, 0.040 mmol (9 mg) $H_3btc-f$, 0.02 mmol (12.8 mg) 4-tppe were dissolved in 3 ml DMA in a glass vial. Then 0.05 ml $HBF_4$ was added into the vial. The capped vial was ultrasonicated until the solution was clear and then put into a 150° C. oven for 2 days. The yellow crystalline powder were isolated and washed with 10 ml DMA for 3 times. The product was analyzed by powder X-ray diffraction, and thermal gravimetric analysis.

Synthesis of $Zn_2(bpdc)_2(tppe)$ (LMOF-241)

4,4'-biphenyldicarboxylic acid ($H_2bpdc$, 0.012 g, 0.05 mmol), 1,1,2,2-tetrakis(4-(pyridin-4-yl)phenyl)ethene (4-tppe, 0.013 g, 0.02 mmol) and $Zn(NO_3)_2 \cdot 6H_2O$ (0.015 g, 0.05 mmol) in DMA/DMSO/isopropanol (4:1:1 v/v/v, 12 mL) were sealed in a 20-mL glass vial. The glass vial was heated to 150° C. and maintained at this temperature for 24 h before it was cooled to room temperature. Colorless needlelike crystals were obtained after filtration. The product was analyzed by microscope, powder X-ray diffraction, and thermal gravimetric analysis.

Synthesis of $Zn_x(ofdc)_y(tppe)_z$ (LMOF-261)

0.050 mmol (14 mg) $Zn(NO_3)_2 \cdot 6H_2O$, 0.030 mmol (9 mg) 9-fluorenone-2,7-dicarboxylic acid ($H_2ofdc$), 0.008 mmol (5 mg) 4-tppe were dissolved in 5 ml DMA, 2 ml DMSO and 8 ml isopropanol in a glass vial. Then 0.05 ml $HBF_4$ was added into the vial. The capped vial was ultrasonicated until the solution was clear and then put into a 150° C. oven for 2 days. The yellow crystalline powder were isolated and washed with 10 ml DMA for 3 times. The product was analyzed by microscope, powder X-ray diffraction, and thermal gravimetric analysis.

Synthesis of $Zn_x(hfipbb)_y(tppe)_z$ (LMOF-271)

0.050 mmol (15 mg) $Zn(NO_3)_2 \cdot 6H_2O$, 0.050 mmol (20 mg) 4,4'-(hexafluoroisopropylidene)bis(benzoic acid) ($H_2hfipbb$), 0.008 mmol (5 mg) 4-tppe were dissolved in 7 ml DMA and 8 ml isopropanol in a glass vial. Then 0.05 ml $HBF_4$ was added into the vial. The capped vial was ultrasonicated until the solution was clear and then put into a 150° C. oven for 3 days. The yellow crystalline powder were isolated and washed with 10 ml DMA for 3 times. The product was analyzed by microscope, powder X-ray diffraction, and thermal gravimetric analysis.

10. Single Crystal X-Ray Diffraction Analysis

Single-crystal synchrotron X-ray diffraction data of LMOF-251 were collected and analyzed at the Advanced Light Source (ALS) in Lawrence Berkeley National Laboratory. The structure was solved by direct methods and refined by full-matrix least-squares on F2 using the Bruker SHELXTL package.

Single crystal data show that the new metal organic framework $[Zn_6(btc)_4(tppe)_2(DMA)_2] \cdot 11DMA$ ($H_3btc$: benzene-1,3,5-tricarboxylic acid; tppe: tetra(4-(pyrid-4-yl)phenypethylene; DMA: dimethylacetamide) (1.11DMA) is a two-fold interpenetrated 3D framework. It crystallizes in triclinic space group P-1(2). The structure is composed of two different building units with one primary building unit (PBU) and one paddle wheel based secondary building unit (SBU). The octahedrally coordinated zinc metal in the PBU is connected to four oxygen atoms from two different carboxylate groups from two different linkers. The zinc atoms of the SBU are coordinated to a total of eight oxygen atoms from four carboxylate groups of four btc linkers. One solvent DMA molecule is coordinated to each zinc metal center. These two types of building blocks are connected by the btc linkers, forming the overall 3D framework. On the other hand, the N-based tppe linker connects the zinc atoms of the primary building unit within the framework. The point symbol of the framework is $\{6^2.8^4\}2\{6^2.8\}4\{6^4.8^2\}5$ with a 4-nodal net topology. The single crystal structure data are listed in Table 6.

TABLE 6

| Single crystal data for LMOF-251 at 150(2) K. | |
|---|---|
| Compound | $[Zn_6(btc)_4(tppe)_2(DMA)_2] \cdot 11DMA$ (LMOF-251) |
| Empirical formula | $C_{136}H_{94}N_{10}O_{26}Zn_6$ |
| Formula weight | 2676.43 |
| Crystal system | Triclinic |
| Space group | P-1 |
| a/Å | 10.117(5) |
| b/Å | 29.539(5) |
| c/Å | 29.556(5) |
| α/° | 91.446(5) |
| β/° | 93.321(5) |
| γ/° | 91.615(5) |
| V, Å$^3$ | 8811(5) |
| Z | 2 |
| Temperature, K | 150(2) |
| □□(radiation wavelength), Å | 0.71073 |
| D, g/cm$^3$ | 1.009 |
| Reflections collected | 89633 |
| Absorption coefficient, mm$^{-1}$ | 0.859 |

TABLE 6-continued

Single crystal data for LMOF-251 at 150(2) K.

| | |
|---|---|
| F(000) | 2736 |
| Crystal size, mm$^3$ | 0.31 × 0.28 × 0.26 |
| Theta range for data collection, deg | 1.38 to 25.00 |
| Index ranges | −12 <= h <= 12, −35 <= k <= 35, −35 <= l <= 35 |
| Independent reflections | 30897 [R(int) = 0.1037] |
| Completeness to theta = 30.49° | 99.7% |
| Absorption correction | Semi-empirical from equivalents |
| Max. and min. transmission | 0.8076 and 0.7767 |
| Refinement method | Full-matrix least-squares on F$^2$ |
| Data/restraints/parameters | 30897/108/1603 |
| Final R indices [I > 2sigma(I)] | R1 = 0.0674, wR$_2$ = 0.1413 |
| R indices (all data) | R$_1$ = 0.1135, wR$_2$ = 0.1524 |
| Goodness-of-fit on F$^2$ | 1.005 |

11. Pore Characterization

Gas sorption measurements were carried out on a volumetric gas sorption analyzer (Autosorb-1 MP, Quantachrome Instruments). Ultra high purity N2 (99.999%) was used for the experiment. Cryogenic temperature (77K) was achieved by using liquid nitrogen as coolant. About 100 mg CH$_2$Cl$_2$ exchanged sample was outgassed at 313K overnight under dynamic vacuum and the subsequent degassed sample was used for the gas sorption experiment. The N2 isotherm was collected in a pressure range from 10$^{-7}$ to 1 atm at 77K. Surface area was analyzed using Autosorbv1.50 software. The BET surface are for LMOF-241' (the ourgassed form of LMOF-241) is 1280 m$^2$/g.

12. Optical Absorption and Fluorescence Spectroscopy

The diffuse reflectance of solid samples were collected on a Shimadzu UV-3600 spectrophotometer at room temperature with a BaSO$_4$ standard as the baseline. The diffuse reflectance was converted to Kubelka-Munk Function as shown below.
The photoluminsecence (PL) study was conducted on a Varian Cary Eclipse spectrophotometer. Measurements were taken on solid samples.

13. Quantum Yield Measurement

The quantum yields of ligand and LMOFs were measured on a Hamamatsu C9220-03 system. Solids samples were used for all measurements.

TABLE 3

A summary of quantum yields.

| Sample name | Excitation wavelength (nm) | Emission Wavelength (nm) | Quantum yield (%) |
|---|---|---|---|
| YAG:Ce | 455 | 530 | 100.3 |
| 4-tppe | 400 | 500 | 57.2 |
| | 420 | 505 | 40.2 |
| | 440 | 510 | 34 |
| | 450 | 514 | 33.2 |
| | 460 | 515 | 32.1 |
| LMOF-251 | 400 | 530 | 88.0 |
| | 420 | 530 | 69.7 |
| | 440 | 530 | 69.2 |
| | 450 | 530 | 64.4 |
| | 460 | 530 | 59.5 |

14. The Emission Spectra of Compound 1 and Compound 2

The excitation and emission spectra of the powder samples of compound 1 and 2 and their ligands were measured at room temperature. While free H$_3$btc does not emit in visible light region the free tppe ligand emits green light upon excitation at 440 nm, which is due presumably to the intramolecular π-π* transition. The density functional theory (DFT) calculation of the molecular orbital of tppe ligand shows the HOMO and LUMO orbitals are π and π* orbitals respectively. Upon excitation at the same wavelength, compound 2 emits yellow light with an emission maximum at 530 nm and a quantum yield of 69.2%, a significant increase compared to 34.0% for the ligand. The DFT calculations also show the emission of compound 1 is tcbpe (ligand) based. In the case of compound 2, the emission is a LLCT type. It is red shifted with regard to that of tppe, and is much stronger compared to the tppe ligand itself. This may be attributed to the stabilization of ligand within MOF which could reduce the non-radiative decay rate and the formation of the framework structure which could maximize the intramolecular/intermolecular interactions among the organic linkers for their energy transfer.

The Commission International de l'Eclairage (CIE) coordinates of 1 and 2 were calculated to be (0.37, 0.56) and (0.35, 0.58), respectively, well within the yellow range and close to the CIE coordinates of commercial yellow phosphor cerium doped yttrium aluminum garnet (YAG:Ce) (0.37, 0.58). The QY values for both 1 and 2 obtained at several selected excitation energies are listed in Table 1. To the best of our knowledge, these values mark the highest among all white and yellow emitting MOFs reported to date.

TABLE 1

Quantum yields of compound 1-2 and tppe ligand.

| QY (%) | $\lambda_{ex}$ (nm) | | | | | |
|---|---|---|---|---|---|---|
| | 400 | 420 | 450 | 460 | 440 | 440$^a$ |
| 1 | 100$^b$ | — | 81.2 | 77.4$^c$ | — | — |
| 2 | 88.0 | 69.7 | 64.4 | 59.5 | 69.2 | 46.5 |
| tppe | 57.2 | 40.2 | 33.2 | 32.1 | 34.0 | 30.0 |

$^a$Measured after sample was heated at 150° C. for 12 hours.
$^b\lambda_{ex}$ = 360 nm
$^c\lambda_{ex}$ = 455 nm A white LED device was assembled using a 5 mm 455-460 nm blue LED chip and sample 2 coated on the surface of the chip. The coating solution was prepared by dispersing powders of 2 in ethyl acetate under ultrasonication for 1 h. The blue LED bulb was dipped into the suspension solution for several times until a thin and uniform film was formed on the surface of the bulb. Bright white light was generated when a 3V voltage was applied. The well-dispersive nature of compound 2 in selected solutions makes it possible to coat the samples on flexible substrates such as a rope or thin cotton strings, which is not achievable with traditional inorganic yellow phosphors.

15. The Stability of Compound 1 and Compound 2

Thermal and moisture stability of the yellow phosphor was examined at various temperatures. The thermal gravimetric analysis (TGA) of Compounds 1 and 2 displays continuously weight loss from room temperature to 150 and 200° C., respectively. Both compounds remain stable until ~450 and ~300° C. before framework decomposition occurs. The PXRD patterns collected after the samples were heated at different temperatures for a given period of time show the structures are stable up to 150 and 180° C., respectively. Both structures also exhibit high photoluminescence (PL) stability. Very small variation in the PL intensity was observed on 2 upon heating to 140° C. (decrease: <8%).

It will be understood by those of skill in the art that numerous and various modifications can be made without departing from the spirit of the present invention. Therefore, it should be understood that the various embodiments of the present invention described herein are illustrative only and not intended to limit the scope of the present invention.

The invention claimed is:

1. A polymeric coordination compound capable of forming a microporous metal organic framework, characterized by a plurality of layers comprising two-dimensional arrays of repeating structural units of formula of $M_a(L^1)_b(L^2)_c \cdot xS$, wherein:
   M is a transition metal cation;
   $L^1$ is an organic ligand comprising 2 to 4 carboxylic acid groups or tetrazolyl groups, wherein at least one of said carboxylic acid groups or tetrazolyl groups is coordinated to a M in the same structural unit, and at least a second of said carboxylic acid groups or tetrazolyl groups is coordinated to a M in a second repeating structural unit within the same layer containing a two-dimensional array of repeating structural units;
   $L^2$ is an organic ligand comprising 2 to 4 nitrogen atoms capable of coordinating to M, wherein $L^2$ coordinates to a M in a layer, and $L^2$ extends essentially perpendicularly from a plane defined by said layer containing a two-dimensional array of repeating structural units to further coordinate with a second M in a repeating structural unit in an adjacent layer;
   S is a solvent capable of coordinating to M or as a guest molecule;
   a and b are each independently an integer greater than 0;
   c is an integer equal or greater than 0;
   x is a fractional number or an integer equal or greater than 0; and
   M, $L^1$, $L^2$, S, a, b, c, and x are so combined that the compound defines channels and pores of molecular size throughout the structure of the compound; and
   provided that when $L^2$ does not contain a phenylene moiety (—$C_6H_4$—) moiety, $L^1$ contains 3 or more phenylene moieties, and
   the formula $M_a(L^1)_b(L^2)_c \cdot xS$ of the repeating structural units is further defined according to one of the following:
   (a) a formula of $M_a(L^1) \cdot xDMA$ wherein
   M is selected from Zn, Cd, and Zr;
   x is 0 or an integer; and
   $L^1$ is selected from 4',4''',4''''',4'''''''-(ethene-1,1,2,2-tetrayl)tetrakis([1,1'-biphenyl]-4-carboxylic acid) (tcbpe), 4',4''',4''''',4'''''''-(ethene-1,1,2,2-tetrayl)tetrakis([1,1'-biphenyl]-3-fluoro-4-carboxylic acid) (tcbpe-F), 1,1,2,2-tetrakis(4'-(2H-tetrazol-5-yl)-[1,1'-biphenyl]-4-yl)ethane (ttzbpe), and 4''',4''''',4'''''',4'''''''''-(ethene-1,1,2,2-tetrayl)tetrakis(([1,1':4',1''-terphenyl]-4-carboxylic acid)) (tctpe); and
   (b) a formula $M_a(L^1)_b(tppe)_c \cdot xS$ (tppe=tetra(4-(pyrid-4-yl)phenyl)ethylene), wherein
   M is Zn, Cd, or Zr,
   c is greater than 0; and
   $L^1$ is a bi-carboxylate or tri-carboxylate ligand selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diyl)dibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and analogs thereof.

2. The compound of claim 1, wherein the formula of the repeating units is $M_2(L^1) \cdot xDMA$.

3. The compound of claim 2, wherein M is Zn; $L^1$ is tcbpe; each Zn atom is tetrahedrally coordinated to O atoms from four tcbpe ligand; all of the carboxylate groups of tcbpe are bidentate with each O atom coordinating to a different Zn atom; two adjacent Zn atoms form an eight-membered ring with carboxylate groups from the ligand; and the overall framework of the compound is three-dimensional (3D) with 1D channel along the c axis.

4. The compound of claim 1, wherein the formula of said repeating structural units is $M_6(btc)_4(tppe)_2 \cdot 11DMA$, wherein M is Zn, Cd, or Zr.

5. The compound of claim 4, wherein said repeating structural units comprise a primary building unit (PBU) and a paddle-wheel based secondary building unit (SBU), wherein
   M is Zn;
   said PBU comprises an octahedrally coordinated Zn connected to four oxygen atoms in two carboxylate groups from two $L^1$ ligands and two N atoms from two tppe ligands;
   said SBU comprise a Zn coordinated to four carboxylate oxygen atoms from four $L^1$ ligands and an O atom from the solvent molecule S; and
   S is dimethyl acetamide (DMA).

6. The compound of claim 5, wherein said two types of building units PBUs and SBUs are connected by the $L^1$ ligand to form 3D nets, said nets interpenetrate to form a 3D framework.

7. The compound of claim 1, wherein $L^1$ in (b) is benzene-1,3,5-tricarboxylic acid (btc).

8. The compound of claim 1, wherein the compound in (b) is
   $M_6(btc)_4(tppe)_2 \cdot 2DMA] \cdot 11DMA$, wherein M is Zn or Cd, or
   $Zr_3(btc)_4(tppe)_c$, wherein c is 1 or 2.

9. A polymeric coordination compound capable of forming a microporous metal organic framework, characterized by a plurality of layers comprising two-dimensional arrays of repeating structural units of formula of $M(L^1)_b(L^2)_c \cdot xS$, wherein $L^1$ is selected from the group consisting of tcbpe, tcbpe-F, 4',4''',4''''',4'''''''-(ethene-1,1,2,2-tetrayl)tetrakis([1,1'-biphenyl]-3-methyl-4-carboxylic acid (tcbpe-$CH_3$), tctpe, 4,4',4'',4'''-(ethene-1,1,2,2-tetrayl)tetrabenzoic acid (tcpe), 4',4''',4''''',4'''''''-(ethene-1,1,2,2-tetrayl)tetrakis([1,1'-biphenyl]-3-amino-4-carboxylic acid (tcbpe-$NH_2$), and ttzbpe; and $L^2$ is selected from the group consisting of 4,4'-bipyridine (4,4'-bpy), 1,2-bis(4-pyridyl)ethylene) (bpee), and 1,2-bipyridylethane (bpe), M is Zn, Cd or Zr, S is a solvent capable of coordinating to M or as a guest molecule, a, b and c are each independently an integer greater than 0, and x is a fractional number or an integer equal or greater than 0.

10. An article of manufacture comprising one or more compounds of claim 1.

11. The article of manufacture of claim 10, wherein the one or more compounds are deposited in a pattern in the article of manufacture such that a light of one or more colors are emitted in a pattern upon exposure to one or more exciting wavelengths.

12. The article of manufacture of claim 10, further comprising a light emitting device having a light source capable of producing one or more wavelengths simultaneously or sequentially in the range of about 300-750 nm.

13. The article of manufacture of claim 12, wherein the light source comprises a light-emitting diode (LED) having a wavelength in the range of about 400-500 nm.

14. The article of manufacture of claim 12, wherein the compound emits a white light when being exposed to an exciting wavelength.

15. The article of manufacture of claim 10, wherein the formula of the repeating units of the compound is $M_2(L^1) \cdot xDMA$, wherein M is selected from Zn, Cd, and Zr;

x is an integer equal or greater than 0; and $L^1$ is selected from tcbpe, tcbpe-F, ttzbpe, and tctpe.

16. The article of manufacture of claim 10, wherein the formula of the repeating units of the compound is $M_a(L^1)_b(tppe)_c \cdot xS$, wherein M is Zn;

S is DMA; and $L^1$ is selected from benzene-1,3,5-tricarboxylate (btc), 2-fluorobenzene-1,3,5-tricarboxylate (btc-f), pyridine-2,4,6-tricarboxylate, 2-aminobenzene-1,3,5-tricarboxylate, 1,3,5-triazine-2,4,6-tricarboxylate, [1,1'-biphenyl]-4,4'-dicarboxylate (bpdc), 4,4'-(perfluoropropane-2,2-diyl)dibenzoate (hfipbb), 9-oxo-9H-fluorene-2,7-dicarboxylate (ofdc), 9-(hydroxymethyl)-9H-fluorene-2,7-dicarboxylate, 9H-fluorene-2,7-dicarboxylate, 9-formyl-9H-fluorene-2,7-dicarboxylate, benzene-1,4-dicarboxylate, naphthalene-1,5-dicarboxylate, naphthalene-1,4-dicarboxylate, 4,4'-oxydibenzoate, (E)-4,4'-(ethene-1,2-diyl)dibenzoate, (E)-4,4'-(diazene-1,2-diyl)dibenzoate, 4,4'-sulfonyldibenzoate, and analogs thereof.

17. A method of producing a light comprising exposing the compound of claim 1 to an exciting wavelength.

18. The method of claim 17, wherein the exciting wavelength is about 400-700 nm.

19. The method of claim 17, wherein the exciting wavelength is produced by a LED in the range of about 430-460 nm and the compound emits a white light upon exposure to the exciting wavelength.

20. The compound of claim 1, which is $Zn_2(tcbpe) \cdot xDMA$.

21. The compound of claim 1, which is $[Zn_6(btc)_4(tppe)_2 \cdot 2DMA] \cdot 11DMA$.

* * * * *